United States Patent
Zhao

(10) Patent No.: US 12,394,392 B2
(45) Date of Patent: Aug. 19, 2025

(54) REFRESH RATE ADJUSTMENT METHOD AND ELECTRONIC DEVICE

(71) Applicant: Honor Device Co., Ltd., Shenzhen (CN)

(72) Inventor: Heping Zhao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/998,910

(22) PCT Filed: Jan. 18, 2022

(86) PCT No.: PCT/CN2022/072608
§ 371 (c)(1),
(2) Date: Nov. 15, 2022

(87) PCT Pub. No.: WO2022/242213
PCT Pub. Date: Nov. 24, 2022

(65) Prior Publication Data
US 2024/0221701 A1 Jul. 4, 2024

(30) Foreign Application Priority Data
May 19, 2021 (CN) .......................... 202110548052.2

(51) Int. Cl.
G09G 5/00 (2006.01)

(52) U.S. Cl.
CPC ..... *G09G 5/005* (2013.01); *G09G 2320/0613* (2013.01); *G09G 2340/0435* (2013.01)

(58) Field of Classification Search
None
See application file for complete search history.

(56) References Cited

U.S. PATENT DOCUMENTS

| | | | |
|---|---|---|---|
| 7,327,329 B2 | 2/2008 | Osamu et al. | |
| 8,334,857 B1 | 12/2012 | Ogrinc et al. | |
| 9,240,031 B1 | 1/2016 | Wang | |
| 10,032,430 B2 | 7/2018 | Huang et al. | |
| 10,133,403 B2 | 11/2018 | Yeh et al. | |
| 10,325,573 B2 | 6/2019 | Wood et al. | |
| 11,069,327 B2 | 7/2021 | Donglei et al. | |
| 2008/0100598 A1 | 5/2008 | Juenger | |
| 2013/0141642 A1 | 6/2013 | Wu et al. | |
| 2014/0055476 A1 | 2/2014 | Wang | |
| 2016/0195988 A1* | 7/2016 | Fu | G06F 3/0446 345/174 |
| 2016/0260416 A1 | 9/2016 | Tann et al. | |

(Continued)

FOREIGN PATENT DOCUMENTS

| | | |
|---|---|---|
| CN | 104091579 A | 10/2014 |
| CN | 104347049 A | 2/2015 |

(Continued)

*Primary Examiner* — Ifedayo B Iluyomade
(74) *Attorney, Agent, or Firm* — Slater Matsil, LLP

(57) ABSTRACT

This application provides a refresh rate adjustment method and an electronic device. The method includes: After playing at least one video source file in response to a first operation of a user, the electronic device adjusts a refresh rate of a display of the electronic device based on three factors, that is, a first frame rate of the at least one video source file currently played, a play status of each video source file, and whether an interaction operation is received.

16 Claims, 18 Drawing Sheets

(56) References Cited

U.S. PATENT DOCUMENTS

| | | |
|---|---|---|
| 2018/0033378 A1* | 2/2018 | Li .................... G09G 3/3611 |
| 2019/0172427 A1* | 6/2019 | Saini .................... G09G 5/18 |
| 2019/0180705 A1 | 6/2019 | Choudha et al. |
| 2021/0065658 A1 | 3/2021 | Donglei et al. |
| 2021/0116988 A1 | 4/2021 | Nidamanuri et al. |
| 2021/0274251 A1 | 9/2021 | Wang |
| 2023/0134189 A1* | 5/2023 | Xu .................... A63F 13/25 463/31 |

FOREIGN PATENT DOCUMENTS

| | | |
|---|---|---|
| CN | 105007443 A | 10/2015 |
| CN | 105869560 A | 8/2016 |
| CN | 108933952 A | 12/2018 |
| CN | 109640168 A | 4/2019 |
| CN | 109688461 A | 4/2019 |
| CN | 110377251 A | 10/2019 |
| CN | 110875978 A | 3/2020 |
| CN | 111324235 A | 6/2020 |
| CN | 111583886 A | 8/2020 |
| CN | 111767013 A | 10/2020 |
| CN | 111782458 A | 10/2020 |
| CN | 111899680 A | 11/2020 |
| CN | 112445315 A | 3/2021 |
| CN | 113438552 A | 9/2021 |
| JP | 2019511009 A | 4/2019 |
| RU | 2646318 C2 | 3/2018 |
| RU | 2680032 C2 | 2/2019 |

\* cited by examiner

REFRESH RATE ADJUSTMENT METHOD AND ELECTRONIC DEVICE

CROSS-REFERENCE TO RELATED APPLICATIONS

This application is a national stage of International Application No. PCT/CN2022/072608, filed on Jan. 18, 2022, which claims priority to Chinese Patent Application No. 202110548052.2, filed on May 19, 2021, both of which are incorporated herein by reference in their entireties.

TECHNICAL FIELD

This application relates to the field of video display, and in particular, to a refresh rate adjustment method and an electronic device.

BACKGROUND

Currently, most applications installed in a terminal device are integrated with a video playback function, and a user is allowed to perform a large quantity of interaction operations in a video playback process. In an existing technical condition, when an application is used to play a video on the terminal device, the terminal usually plays, at a large fixed refresh rate, video source files with different frame rates, to be compatible with the video source files with the different frame rates.

However, when a frame rate of a video source is greater than a frame rate corresponding to a refresh rate of a display of the terminal, a video playback frame loss occurs in the terminal and user experience is poor. When a frame rate of a video source is less than a frame rate corresponding to a refresh rate of a display of the terminal, an invalid frame refresh occurs, and energy consumption of the terminal is increased. In addition, if the refresh rate of the display of the terminal is low, once a user performs an interaction operation in a video watching process, the frame rate corresponding to the refresh rate of the display may be less than a frame rate required for an animation effect corresponding to the interaction operation. Therefore, the user obviously perceives stalling. In conclusion, in the conventional technology, a technical means of using a fixed refresh rate to play video source files with different frame rates resulting in poor user experience.

SUMMARY

This application provides a refresh rate adjustment method and an electronic device, to properly adjust a refresh rate of a display of the electronic device during video playing, and improve user experience.

According to a first aspect, this application provides a refresh rate adjustment method. The method can be applied to an electronic device. In the method, the electronic device may receive a first operation used to trigger the electronic device to play at least one video source file; and play the at least one video source file at a first refresh rate in response to the first operation, and obtain a first frame rate of the at least one video source file and a play status of each of the at least one video source file, where the play status includes a playing state or a playing stop state, and the first refresh rate is less than or equal to a maximum refresh rate of a display of the electronic device. Then, when the electronic device receives an interaction operation performed by a user in a playback interface of any one of the at least one video source file, the electronic device plays the at least one video source file at a second refresh rate, where the second refresh rate is less than or equal to the maximum refresh rate of the display of the electronic device, and a frame rate corresponding to the second refresh rate is within a preset range of a frame rate required for an animation effect corresponding to the interaction operation. When the electronic device does not receive the interaction operation again within preset duration from a time point of receiving the first operation or a previous interaction operation, and the at least one video source file includes a video source file that is being played, if the first frame rate is greater than a frame rate corresponding to a third refresh rate, the electronic device plays the at least one video source file at the third refresh rate; and if the first frame rate is less than or equal to the frame rate corresponding to the third refresh rate, the electronic device plays the at least one video source file at a refresh rate corresponding to the first frame rate, where the third refresh rate is less than or equal to the maximum refresh rate of the display of the electronic device.

The first refresh rate, the second refresh rate, and the third refresh rate may be preset in the electronic device after being obtained based on an actual investigation result, or may be set by a user in a plurality of setting manners.

According to the foregoing technical solution, in a process of playing the video source file, the electronic device adjusts the refresh rate of the display based on three factors, that is, the first frame rate of the at least one video source file currently played, the play status of each video source file, and whether the user operation is received. In the three factors, the frame rate of the video source file determines a proper refresh rate required when the video source file is played, whether the video source file is being played directly determines whether there is content that needs to be displayed by the display through refreshing currently, and the animation effect required for the interaction operation performed by the user can be displayed without stalling only when there is a higher refresh rate. Therefore, after the three factors are combined in this application, the refresh rate of the display at which the video source file is played can be properly adjusted, so that the refresh rate of the display of the electronic device and the refresh rate required in the video source file playback process are closer or equal. Whether the video source file is played smoothly is determined by a similarity between the refresh rate required in the video source file playback process and the refresh rate of the display. A closer similarity indicates a smoother playback process, more power-saving, and better user experience. Therefore, in conclusion, according to the technical solution provided in this application, user experience can be improved when the electronic device plays the video source file.

In a possible implementation of the first aspect, the method further includes: if the electronic device does not receive the interaction operation again within the preset duration from the time point of receiving the first operation or the previous interaction operation, and the at least one video source file does not include the video source file that is being played, adjusting the refresh rate of the display of the electronic device based on to-be-displayed content of the electronic device.

According to the foregoing solution, if the electronic device does not receive the interaction operation again within the preset duration from the time point of previously receiving an operation (the first operation or the previous interaction operation) performed by the user on the electronic device, and all the video source files stop to be played, it indicates that the user may no longer perform the interaction operation currently. Therefore, the refresh rate of the display in this case may no longer be the frame rate used to match the animation effect corresponding to the interaction operation, and the display does not need to play the video source files. In this case, the electronic device only needs to refresh the display when there is content that needs to be displayed (to-be-displayed content), and does not refresh the display once there is no content that needs to be displayed. In this case, the refresh rate of the display can be 0, energy consumption of the electronic device can be reduced, and user experience can be improved.

In another possible design of the first aspect, in actual application, after controlling the electronic device to play a video, the user is more likely to further perform a specific interaction operation based on preferences of the user. In this case, the first operation may be considered as an interaction operation, and the first refresh rate may be set to be the same as the second refresh rate. In this way, an action of switching the refresh rate once is reduced, and some discomfort caused because the user perceives a change of the refresh rate in the video watching process is avoided, thereby improving user experience.

In another possible design of the first aspect, the obtaining a first frame rate of the at least one video source file may include: The electronic device obtains a frame rate of each of the at least one video source file. The electronic device determines the first frame rate of the at least one video source file according to a preset rule and based on frame rates of all of the at least one video source file.

For example, the preset rule may be as follows: The electronic device uses a maximum frame rate in the frame rates of all of the at least one video source file as a second frame rate. Alternatively, the electronic device uses an average value of the frame rates of all of the at least one video source file as a second frame rate. Alternatively, when receiving a selection operation performed by the user on the frame rates of all of the at least one video source file, the electronic device uses a frame rate selected by the user as a second frame rate. The electronic device determines the first frame rate based on the second frame rate.

According to the foregoing solution, the first frame rate of the at least one video source file currently played by the electronic device is determined according to a specific rule, and the first frame rate is used to represent the frame rates of all of the at least one video source file. Subsequently, the refresh rate of the display that is determined by the electronic device based on the first frame rate can match all the video source files to some extent, so that a watching effect of the user is better.

In another possible design of the first aspect, the determining the first frame rate based on the second frame rate includes: if the second frame rate is within a preset frame rate range, using the second frame rate as the first frame rate. A minimum value in the preset frame rate range may be a frame rate of the video source file at which a human eye can perceive obvious picture switching (stalling) when the video source file is played, and a maximum value in the preset frame rate range may be a preset maximum frame rate. The preset maximum frame rate may be greater than a frame rate corresponding to the maximum refresh rate of the display of the electronic device.

In this way, after the second frame rate is preliminarily determined based on the frame rates of all of the at least one video source file, the second frame rate is determined as the first frame rate only when the second frame rate is within a proper frame rate range (the preset frame rate range). This ensures that the electronic device smoothly plays the video source file, and ensures watching experience of the user (without perceiving stalling) in the playback process.

In another possible design of the first aspect, there may be improperness of a rule of obtaining the second frame rate or an error existing when the frame rate of the video source is obtained, and therefore the finally obtained second frame rate is not within the preset frame rate range, that is, the second frame rate does not exist, or is greater than a preset maximum frame rate, or is less than a frame rate of the video source file at which a human eye can perceive obvious picture switching (stalling) when the video source file is played. These cases indicate that the second frame rate is an abnormal frame rate. Therefore, in this case, the frame rate corresponding to the third refresh rate may be used as the first frame rate, to ensure that the electronic device smoothly plays the video source file.

In another possible design of the first aspect, that the electronic device obtains a frame rate of each of the at least one video source file may include: The electronic device performs the following operation on each of the at least one video source file, to obtain the frame rate of each of the at least one video source file: When attribute information of a first video source file includes frame rate information, the electronic device may obtain a frame rate in the attribute information of the first video source file.

In this way, the frame rate of each of the at least one video source file can be quickly obtained to provide data support for subsequent adjustment of the refresh rate.

In another possible design of the first aspect, that the electronic device obtains a frame rate of each of the at least one video source file may include: The electronic device performs the following operation on each of the at least one video source file, to obtain the frame rate of each of the at least one video source file: When attribute information of a first video source file does not include frame rate information, the electronic device may search a search platform for the first video source file, to obtain a frame rate of the first video source file from the search platform.

In this way, when the attribute information of the video source file does not include the frame rate information, the frame rate of each of the at least one video source file can be quickly obtained to provide data support for subsequent adjustment of the refresh rate.

In another possible design of the first aspect, a frame loss often occurs in some video source files (such as live videos), and therefore an actual frame rate at which the video source file is played is different from the frame rate indicated in the attribute information of the video source file. Therefore, to more accurately obtain the actual frame rate of the video source file, that the electronic device obtains a frame rate of each of the at least one video source file may include: The electronic device performs the following operation on each of the at least one video source file, to obtain the frame rate of each of the at least one video source file: When a type of a first video source file is a preset type, the electronic device calculates the frame rate of the first video source file based on a characteristic parameter of the first video source file, where the characteristic parameter includes a size, duration, and resolution, and the first video source file is any one of the at least one video source file.

For example, a specific formula in which the frame rate of the first video source file is calculated based on the characteristic parameter of the first video source file may be as follows: Frame rate=Video size/(Duration×Resolution coefficient). The resolution coefficient is determined based on different specifications of resolution. For example, a resolution coefficient corresponding to resolution 720 P is 50, a resolution coefficient corresponding to resolution 480 P is 5, and a resolution coefficient corresponding to resolution 1080 P is 75.

In another possible design of the first aspect, the second refresh rate and the third refresh rate are pre-configured refresh rates. Alternatively, the second refresh rate and the third refresh rate are set by the electronic device in response to a setting operation of the user.

The pre-configured refresh rates may be obtained based on a result of actually investigating a large quantity of videos and electronic devices, so that the electronic device plays the video source file at the second refresh rate or the third refresh rate, thereby ensuring user experience of the electronic device. For example, when the electronic device is a mobile phone dedicated to games, because a frame rate of a game video is high, the second refresh rate and the third refresh rate may be pre-configured to be more than 60 frames. For another example, when the electronic device is a mobile phone dedicated to photographing, because a video often played by the mobile phone may not have a high frame rate, the second refresh rate and the third refresh rate may be pre-configured to be approximately or even less than 60 frames.

When the second refresh rate and the third refresh rate are set through a setting operation of the user, the user may set the second refresh rate and the third refresh rate required by the user in any feasible interaction scenario. For example, the user may set the second refresh rate and the third refresh rate through a setting menu of the electronic device before the video source file is triggered to be played. Alternatively, the user may set the second refresh rate and the third refresh rate in a setting menu of an application corresponding to the video source file. Alternatively, when the video source file is triggered to be played, the electronic device displays a pop-up box to indicate the user to set the second refresh rate and the third refresh rate. Alternatively, the user may set the second refresh rate and the third refresh rate through a voice instruction. In this way, user requirements can be ensured, the video source file can be played at different refresh rates based on different user requirements, and user experience can be improved.

In another possible design of the first aspect, to ensure interaction experience in a process in which the user performs the interaction operation, when the second refresh rate is a pre-configured refresh rate, the frame rate corresponding to the second refresh rate is a maximum value in a preset range of the frame rate required for the animation effect corresponding to the interaction operation.

In this way, a refresh rate corresponding to the maximum value in the preset range of the frame rate required for the animation effect corresponding to the interaction operation is used as the second refresh rate, so that the animation effect presented by the interaction operation performed by the user in the process in which the user watches the video source file played by the electronic device can be smoother, and interaction experience of the user can be better.

In another possible design of the first aspect, because the frame rate of the animation effect corresponding to the interaction operation in actual application usually needs to be greater than the frame rate of the video source file, in this application, the third refresh rate is greater than the second refresh rate.

According to a second aspect, this application provides an electronic device. The electronic device includes a display, a memory, and one or more processors. The display and the memory are coupled to the processor. The memory stores computer program code, and the computer program code includes computer instructions. When the computer instructions are executed by the processor, the electronic device is enabled to perform the refresh rate adjustment method according to any one of the first aspect or the possible designs of the first aspect.

According to a third aspect, this application provides an electronic device. The electronic device includes a display, a memory, and one or more processors. The display and the memory are coupled to the processor. The memory stores computer program code, and the computer program code includes computer instructions. When the computer instructions are executed by the processor, the electronic device is enabled to perform the following steps: The electronic device receives a first operation, where the first operation is used to trigger the electronic device to play at least one video source file. In response to the first operation, the processor controls the display to play the at least one video source file at a first refresh rate, and obtain a first frame rate of the at least one video source file and a play status of each of the at least one video source file, where the play status includes a playing state or a playing stop state, and the first refresh rate is less than or equal to a maximum refresh rate of the display of the electronic device. When the electronic device receives an interaction operation performed by a user in a playback interface of any one of the at least one video source file, the processor adjusts the refresh rate of the display of the electronic device to a second refresh rate, where the second refresh rate is less than or equal to the maximum refresh rate of the display of the electronic device, and a frame rate corresponding to the second refresh rate is within a preset range of a frame rate required for an animation effect corresponding to the interaction operation. When the electronic device does not receive the interaction operation again within preset duration from a time point of receiving the first operation or a previous interaction operation, and the at least one video source file includes a video source file that is being played, if the first frame rate is greater than a frame rate corresponding to a third refresh rate, the processor adjusts the refresh rate of the display of the electronic device to the third refresh rate. If the first frame rate is less than or equal to the frame rate corresponding to the third refresh rate, the controller adjusts the refresh rate of the display of the electronic device to a refresh rate corresponding to the first frame rate, where the third refresh rate is less than or equal to the maximum refresh rate of the display of the electronic device.

In a possible design of the third aspect, when the computer instructions are executed by the processor, the electronic device is enabled to further perform the following step: If the electronic device does not receive the interaction operation again within the preset duration from the time point of receiving the first operation or the previous interaction operation, and the at least one video source file does not include the video source file that is being played, the processor adjusts the refresh rate of the display of the electronic device based on to-be-displayed content of the electronic device.

In another possible design of the third aspect, the first refresh rate is equal to the second refresh rate.

In another possible design of the third aspect, when the computer instructions are executed by the processor, the electronic device is enabled to specifically perform the following steps: The processor obtains a frame rate of each of the at least one video source file. The processor uses a maximum frame rate in frame rates of all of the at least one video source file as a second frame rate. Alternatively, the processor uses an average value of frame rates of all of the at least one video source file as a second frame rate. Alternatively, when receiving a selection operation performed by the user on frame rates of all of the at least one video source file, the processor uses a frame rate selected by the user as a second frame rate. The processor determines the first frame rate based on the second frame rate.

In another possible design of the third aspect, when the computer instructions are executed by the processor, the electronic device is enabled to specifically perform the following step: If the second frame rate is within a preset frame rate range, the processor uses the second frame rate as the first frame rate.

In another possible design of the third aspect, when the computer instructions are executed by the processor, the electronic device is enabled to further specifically perform the following step: If the second frame rate is not within the preset frame rate range, the processor uses the frame rate corresponding to the third refresh rate as the first frame rate.

In another possible design of the third aspect, when the computer instructions are executed by the processor, the electronic device is enabled to specifically perform the following steps: The processor performs the following operations on each of the at least one video source file, to obtain the frame rate of each of the at least one video source file: The processor obtains a frame rate in attribute information of a first video source file. Alternatively, the processor searches a search platform for the first video source file, to obtain a frame rate of the first video source file from the search platform. Alternatively, the processor calculates the frame rate of the first video source file based on a characteristic parameter of the first video source file, where the characteristic parameter includes a size, duration, and resolution, and the first video source file is any one of the at least one video source file.

In another possible design of the third aspect, the second refresh rate and the third refresh rate are pre-configured refresh rates. Alternatively, the second refresh rate and the third refresh rate are set by the electronic device in response to a setting operation of the user.

In another possible design of the third aspect, to ensure interaction experience in a process of implementing the interaction operation by the user, when the second refresh rate is a pre-configured refresh rate, the frame rate corresponding to the second refresh rate is a maximum value within the preset range of the frame rate required for the animation effect corresponding to the interaction operation.

In another possible design of the third aspect, the third refresh rate is greater than the second refresh rate.

According to a fourth aspect, this application provides a computer-readable storage medium. The computer-readable storage medium includes computer instructions. When the computer instructions are run on an electronic device, the electronic device is enabled to perform the refresh rate adjustment method according to any one of the first aspect or the possible designs of the first aspect.

According to a fifth aspect, this application provides a computer program product. When the computer program product runs on a computer, the computer is enabled to perform the refresh rate adjustment method according to any one of the first aspect or the possible designs of the first aspect. The computer may be the foregoing electronic device.

It may be understood that for beneficial effects that can be achieved by the electronic devices according to any one of the second aspect or the possible designs of the second aspect and any one of the third aspect or the possible designs of the third aspect, the computer storage medium according to the fourth aspect, and the computer program product according to the fifth aspect, reference may be made to the beneficial effects according to any one of the first aspect or the possible designs of the first aspect. Details are not described herein again.

DETAILED DESCRIPTION OF ILLUSTRATIVE EMBODIMENTS

Figure 1:
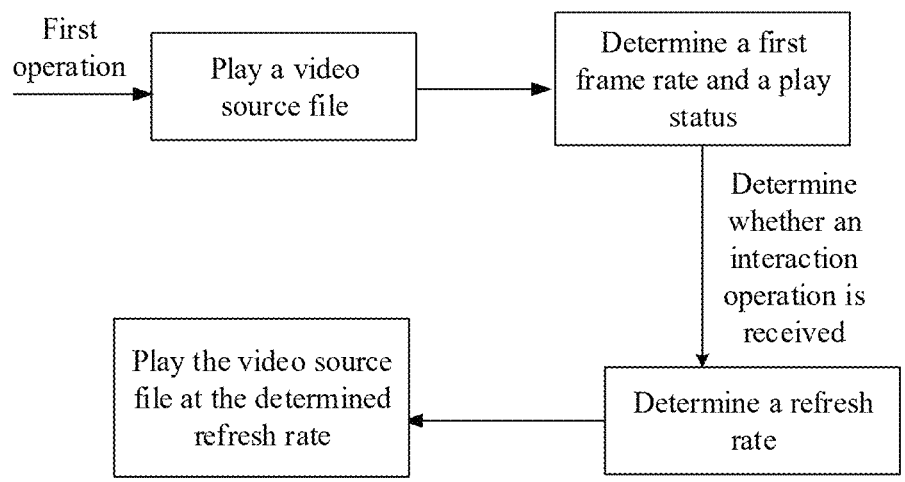
FIG. 1 is a schematic diagram of a principle of a refresh rate adjustment method according to an embodiment of this application.

In the following descriptions, terms "first" and "second" are merely used for description, but it shall not be understood as an indication or implication of relative importance or an implicit indication of a quantity of indicated technical features. Therefore, features limited by "first" and "second" may explicitly or implicitly include one or more features. In the descriptions of embodiments, "a plurality of" means two or more, unless otherwise specified.

Related technical terms in this application are first described as follows:

Frame rate: The frame rate is a frequency (rate) at which bitmap images in units of frames appear continuously on a display. The frame rate may also be referred to as a frame frequency, and is represented in hertz (Hz).

Refresh rate: The refresh rate is a refresh frequency, and refers to a speed at which the screen is refreshed. The refresh rate is usually a vertical refresh rate. The vertical refresh rate represents a quantity of times that an image on the screen image is redrawn per second, that is, a quantity of times that the screen is refreshed per second, and is in units of Hz (hertz). A higher refresh rate indicates a more stable image, more natural and clear image display, and less impact on an eye. A lower refresh frequency indicates severer image flickers and jitters, and faster eye fatigues.

With continuous development of performance of intelligent terminal devices, most applications installed in the terminal device currently are integrated with a video playback function, and a user is allowed to perform a large quantity of interaction operations in a video playback process. For example, when watching a live video by using a short video application, the user may send a gift or send bullets to a host by performing an operation on a touchscreen. In the conventional technology, video source files played by the terminal device come from a wide variety of sources, and frame rates of different video source files are also different. Therefore, it cannot be ensured that the terminal device plays content at a refresh rate corresponding to a frame rate of each video source file. To resolve this problem, the terminal device usually plays, at a high fixed refresh rate, video source files with different frame rates. For example, the terminal device plays any video source file at a refresh rate of 60 Hz.

However, there are the following problems: (1) If the terminal device plays a video source file with a lower frame rate at a higher refresh rate, a same frame is refreshed repeatedly, system load and power consumption are increased, use time of the terminal is affected, and user experience is reduced. (2) If the terminal device plays a video source file with a higher frame rate at a lower refresh rate, a frame loss occurs, causing poor user experience. In addition, if the user performs an interaction operation on the terminal device in a video playback process, an animation effect with a higher frame rate that corresponds to the interaction operation cannot be displayed very well, and the user perceives stalling, which greatly affects user experience.

Based on this, this application provides a refresh rate adjustment method. The method can be applied to an electronic device. Refer to FIG. 1. The electronic device may play a video source file (for example, at least one video source file) in response to a user operation, and then may determine a first frame rate of the at least one video source file and a play status of each video source file. Then, the electronic device may determine, based on whether the interaction operation and the foregoing obtained related data (for example, the first frame rate and the play status) are received, which refresh rate to be used to play the at least one video source file. In this way, because the refresh rate is determined by combining a plurality of factors that can affect user experience, playing the video file at the refresh rate brings better visual experience to the user.

For example, the electronic device in this embodiment of this application may be a device that can play a video, such as a mobile phone, a tablet computer, a wearable device (for example, a smart watch or a smart band), an ultra-mobile personal computer (ultra-mobile personal computer, UMPC), a netbook, a cellular phone, a personal digital assistant (personal digital assistant, PDA), or an augmented reality (augmented reality, AR)/virtual reality (virtual reality, VR) device. A specific form of the electronic device is not specially limited in this embodiment of this application.

Figure 2:
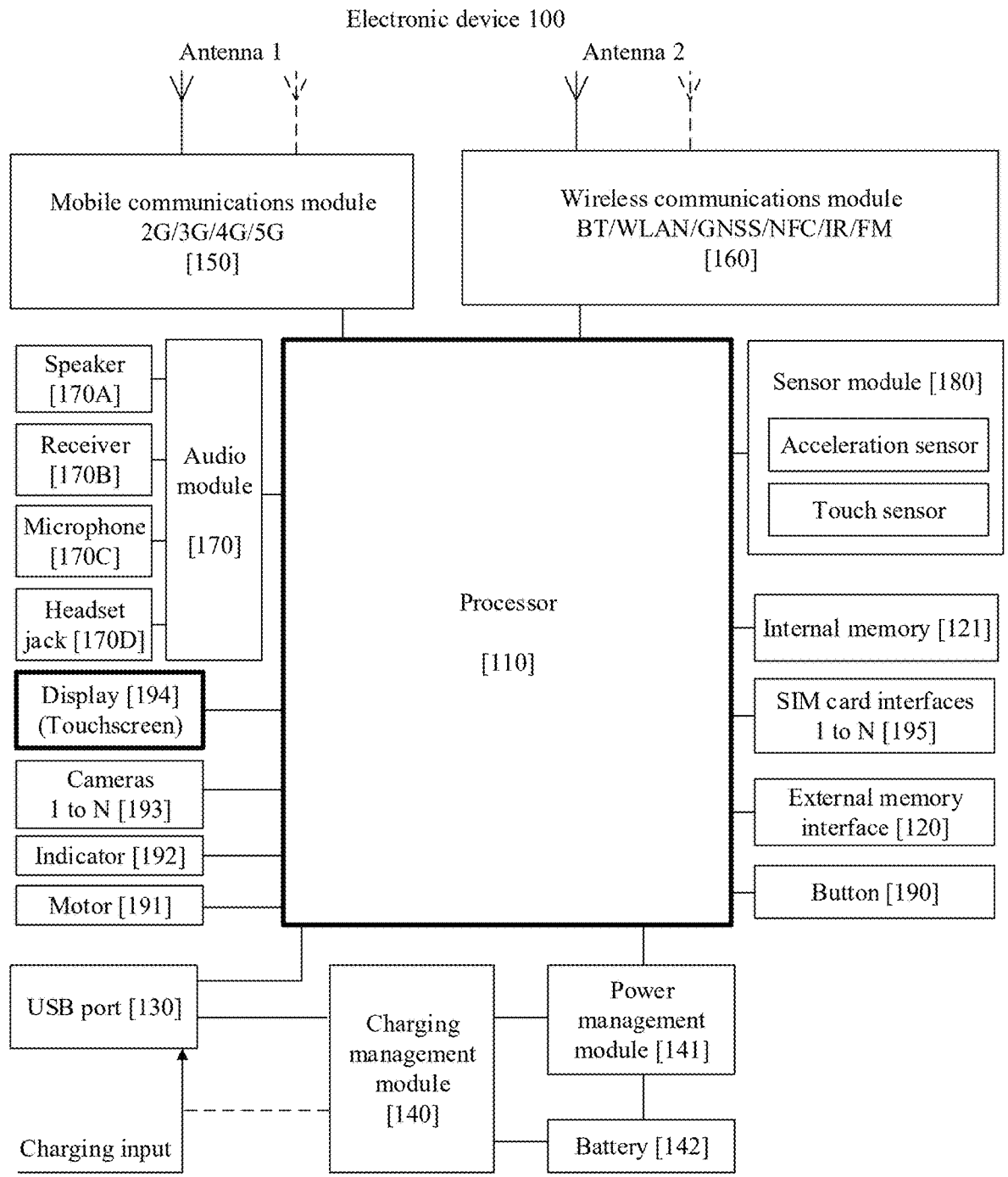
FIG. 2 is a schematic diagram of a hardware structure of an electronic device according to an embodiment of this application.

For example, the electronic device is a mobile phone. As shown in FIG. 2, the electronic device may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The sensor module 180 may include a pressure sensor, a gyro sensor, a barometric pressure sensor, a magnetic sensor, an acceleration sensor, a distance sensor, an optical proximity sensor, a temperature sensor, a touch sensor, an ambient light sensor, a bone conduction sensor, and the like.

It may be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), a micro controller unit (micro controller unit, MCU), and/or the like. Different processing units may be independent devices, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access, and reduces a waiting time of the processor 110, to improve system efficiency.

In some embodiments, the processor 110 may include one or more interfaces. The interface may include an inter-integrated circuit (inter-integrated circuit, I2C) interface, a serial peripheral interface (serial peripheral interface, SPI), an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

It may be understood that the interface connection relationship between the modules shown in this embodiment of this application is merely an example for description, and does not constitute a limitation on the structure of the electronic device 100. In some other embodiments of this application, the electronic device 100 may also use an interface connection manner different from that in the foregoing embodiment or a combination of a plurality of interface connection manners.

The charging management module 140 is configured to receive a charging input from a charger. The power management module 141 is configured to connect the battery 142 and the charging management module 140 to the processor 110. The power management module 141 receives an input/inputs from the battery 142 and/or the charging management module 140, and supplies power to the processor 110, the internal memory 121, the external memory, the display 194, the camera 193, the wireless communications module 160, and the like. In some other embodiments, the power management module 141 and the charging management module 140 may alternatively be disposed in a same device.

A wireless communication function of the electronic device 100 may be implemented by the antenna 1, the antenna 2, the mobile communications module 150, the wireless communications module 160, the modem processor, the baseband processor, and the like. The antenna 1 and the antenna 2 are configured to: transmit and receive electromagnetic wave signals. Each antenna in the electronic device 100 may be used to cover one or more communication bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The wireless communications module 160 may provide a wireless communication solution that includes a wireless local area network (wireless local area network, WLAN) (for example, a Wi-Fi network), Bluetooth (Bluetooth, BT), a global navigation satellite system (global navigation satellite system, GNSS), frequency modulation (frequency modulation, FM), NFC, an infrared (infrared, IR) technology, and the like and that is applied to the electronic device 100.

The electronic device 100 implements a display function through the GPU, the display 194, the application processor, and the like. The GPU is a microprocessor for image processing, and is connected to the display 194 and the application processor. The GPU is configured to perform mathematical and geometric calculation and graphics rendering. The processor 110 may include one or more GPUs that execute program instructions to generate or change display information.

The display 194 is configured to display an image, a video, and the like. The display may be a touchscreen. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like. The ISP is configured to process data fed back by the camera 193. The camera 193 is configured to capture a static image or a video. In some embodiments, the electronic device 100 may include one or N cameras 193, where N is a positive integer greater than 1.

The NPU is a neural-network (neural-network, NN) computing processor. The NPU quickly processes input information by referring to a structure of a biological neural network, for example, by referring to a transfer mode between human brain neurons, and can further perform continuous self-learning. The NPU can implement applications such as intelligent cognition of the electronic device 100, for example, film state recognition, image repair, image recognition, facial recognition, speech recognition, and text understanding.

The external memory interface 120 may be configured to connect an external storage card, such as a micro SD card, to extend a storage capability of the electronic device 100. The external storage card communicates with the processor 110 through the external memory interface 120 to implement a data storage function. For example, files such as music and video are stored in the external storage card.

The internal memory 121 may be configured to store computer-executable program code, where the executable program code includes instructions. The processor 110 performs various function applications of the electronic device 100 and data processing by running the instructions stored in the internal memory 121. The internal memory 121 may include a program storage area and a data storage area. The program storage area may store an operating system, an application required by at least one function (such as a sound playing function or an image playing function), and the like. The data storage area may store data (such as audio data or an address book) created during use of the electronic device 100. Further, the internal memory 121 may include a high-speed random access memory, and may further include a nonvolatile memory, for example, at least one disk storage device, a flash memory device, or a universal flash storage (universal flash storage, UFS), The electronic device 100 may implement an audio function, for example, music playing or recording, through the audio module 170, the speaker 170A, the receiver 170B, the microphone 170C, the headphone jack 170D, the application processor, and the like.

The touch sensor is also referred to as a "touch panel (TP)". The touch sensor may be disposed on the display 194, and the touch sensor and the display 194 form a touchscreen. The touch sensor is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor may also be disposed on a surface of the electronic device 100 at a location different from that of the display 194.

The button 190 includes a power-on button, a volume button, and the like. The motor 191 may generate a vibration prompt. The indicator 192 may be an indicator light, and may be used to indicate a charging status and a battery level change, or may be used to indicate a message, a missed call, a notification, and the like. The SIM card interface 195 is configured to connect to a SIM card.

Figure 3:
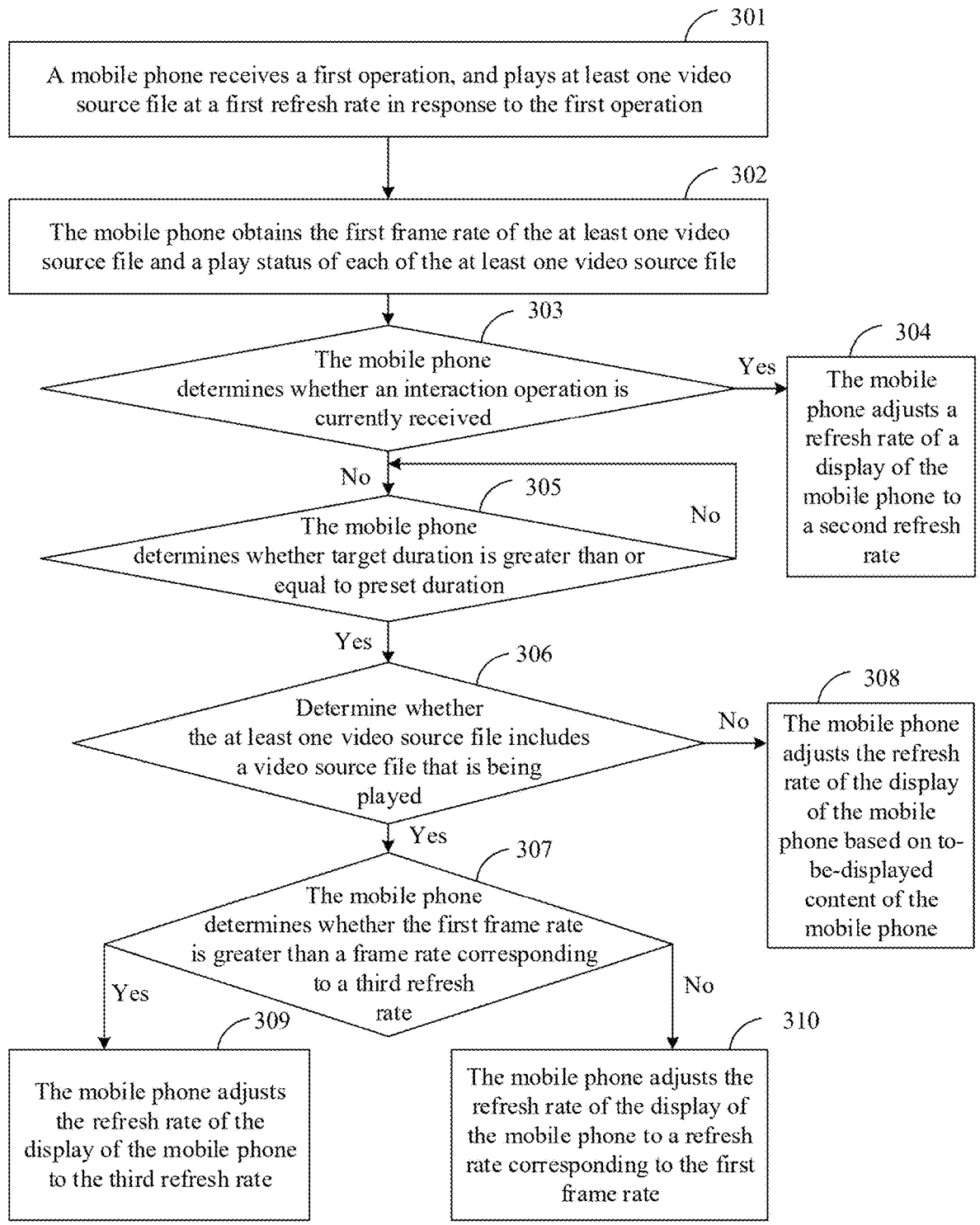
FIG. 3 is a schematic flowchart of a refresh rate adjustment method according to an embodiment of this application.

An embodiment of this application provides a refresh rate adjustment method. The method can be applied to an electronic device including a display. For example, the electronic device is a mobile phone. Refer to FIG. 3. The refresh rate adjustment method may include 301 to 310.

301: The mobile phone receives a first operation, and plays at least one video source file at a first refresh rate in response to the first operation.

The first operation is used to trigger the mobile phone to play the at least one video source file, and the first refresh rate is less than or equal to a maximum refresh rate of a display of the electronic device. The first refresh rate may be preset in the mobile phone after being obtained based on an empirical value in advance, or may be set by a user (set in various interaction manners, where for details, refer to related descriptions of the following setting manners of a second refresh rate and a third refresh rate).

For example, the first operation may be taping a video in an application on a touchscreen of the mobile phone, or may be an operation that the user wakes up a smart assistant of the mobile phone by using a voice and issues a corresponding voice instruction to open a video in an application, or may be any other feasible manner.

Figure 4A:
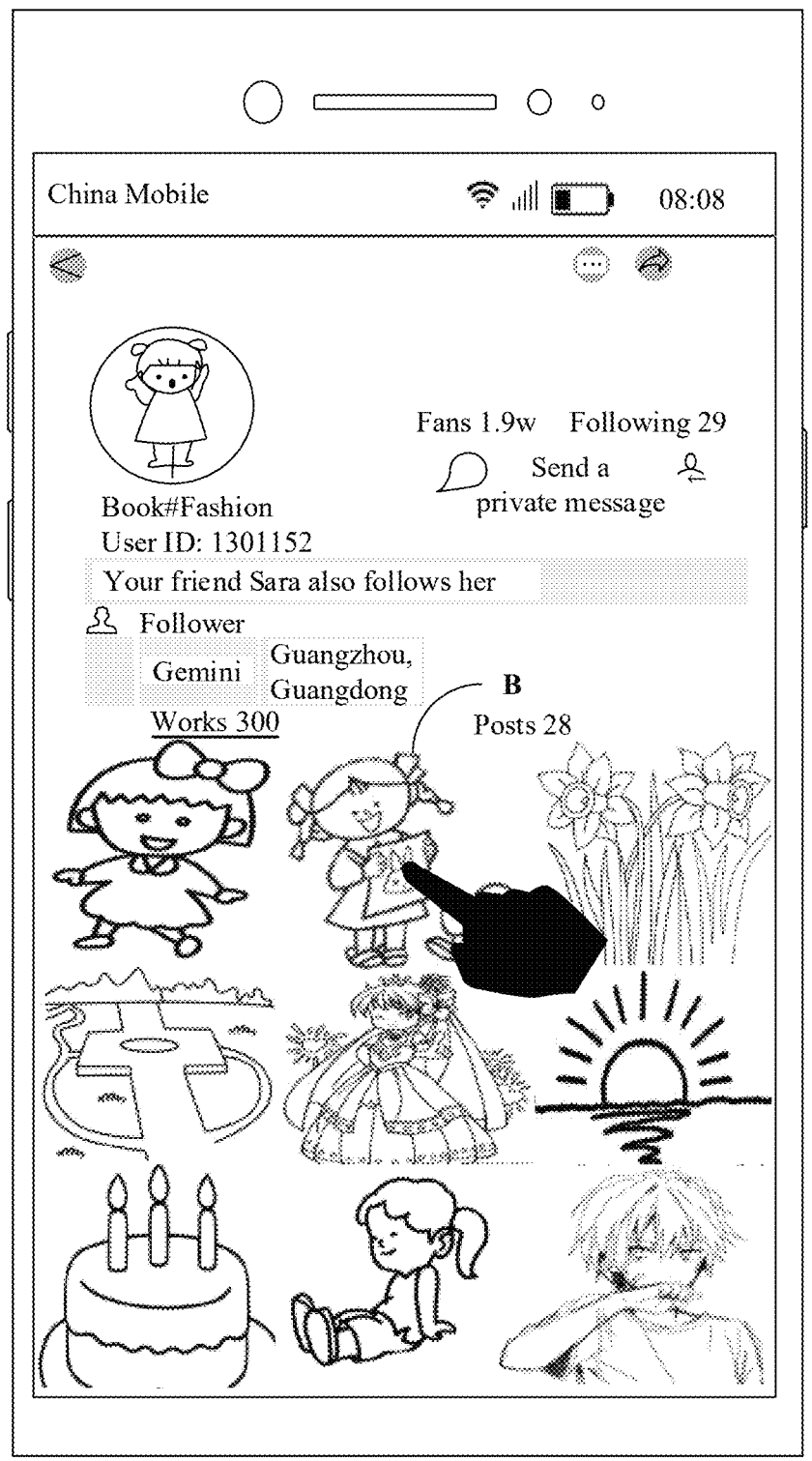
FIG. 4($a$) and FIG. 4($b$) are a schematic diagram of a video playback scenario according to an embodiment of this application.
Figure 4B:
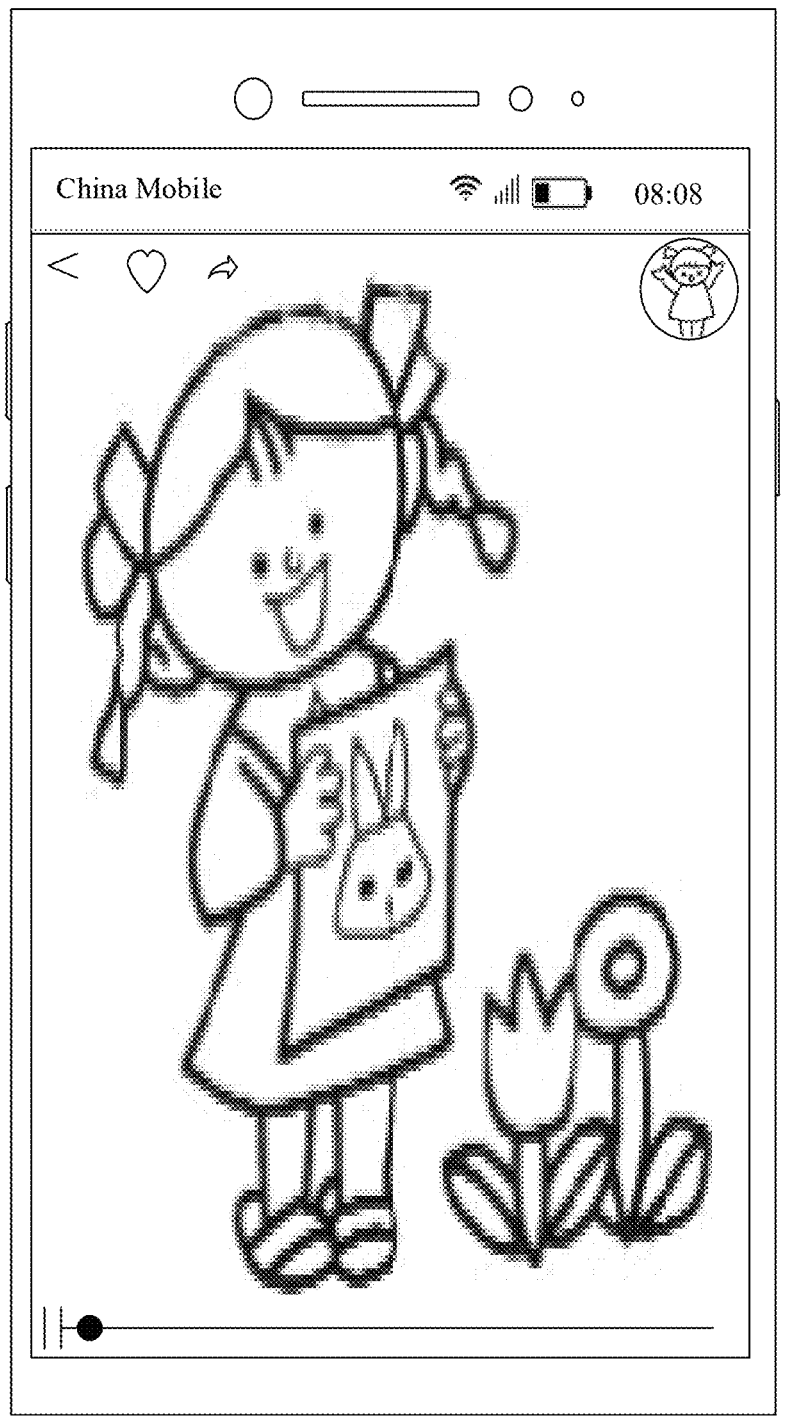

In a first application scenario, the mobile phone displays a preview interface of an application A shown in FIG. 4(a). The preview interface may include thumbnails of a plurality of videos. The first operation may be a tap operation performed by the user on a video B in the preview interface. As shown in FIG. 4(b), in response to the tap operation performed by the user on the video B, the mobile phone plays the video B at the first refresh rate. For example, a maximum refresh rate supported by the mobile phone is 90 Hz, and the first refresh rate may be 60 Hz.

Figure 5A:
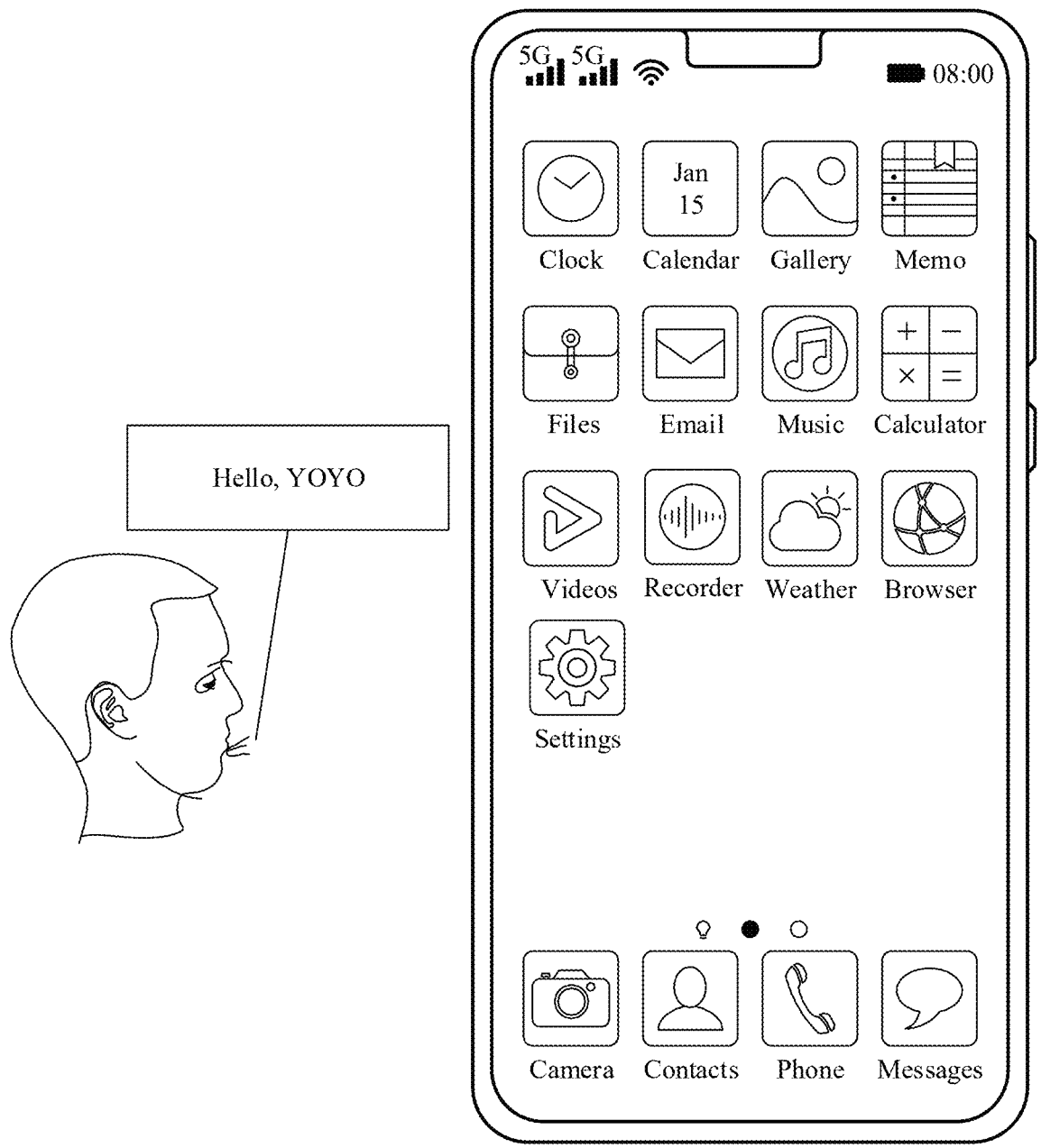
FIG. 5($a$) to FIG. 5($d$) are a schematic diagram of another video playback scenario according to an embodiment of this application.
Figure 5B:
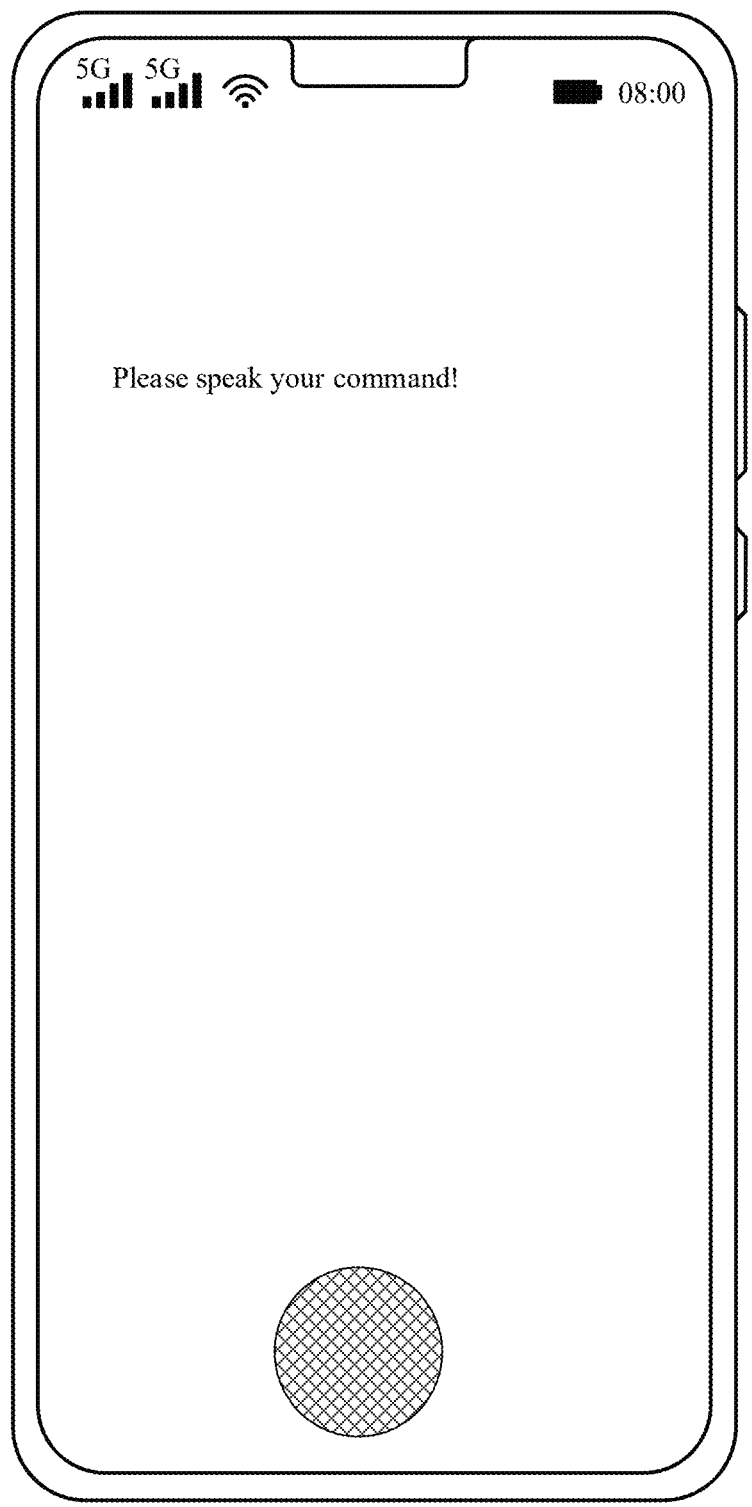
Figure 5C:
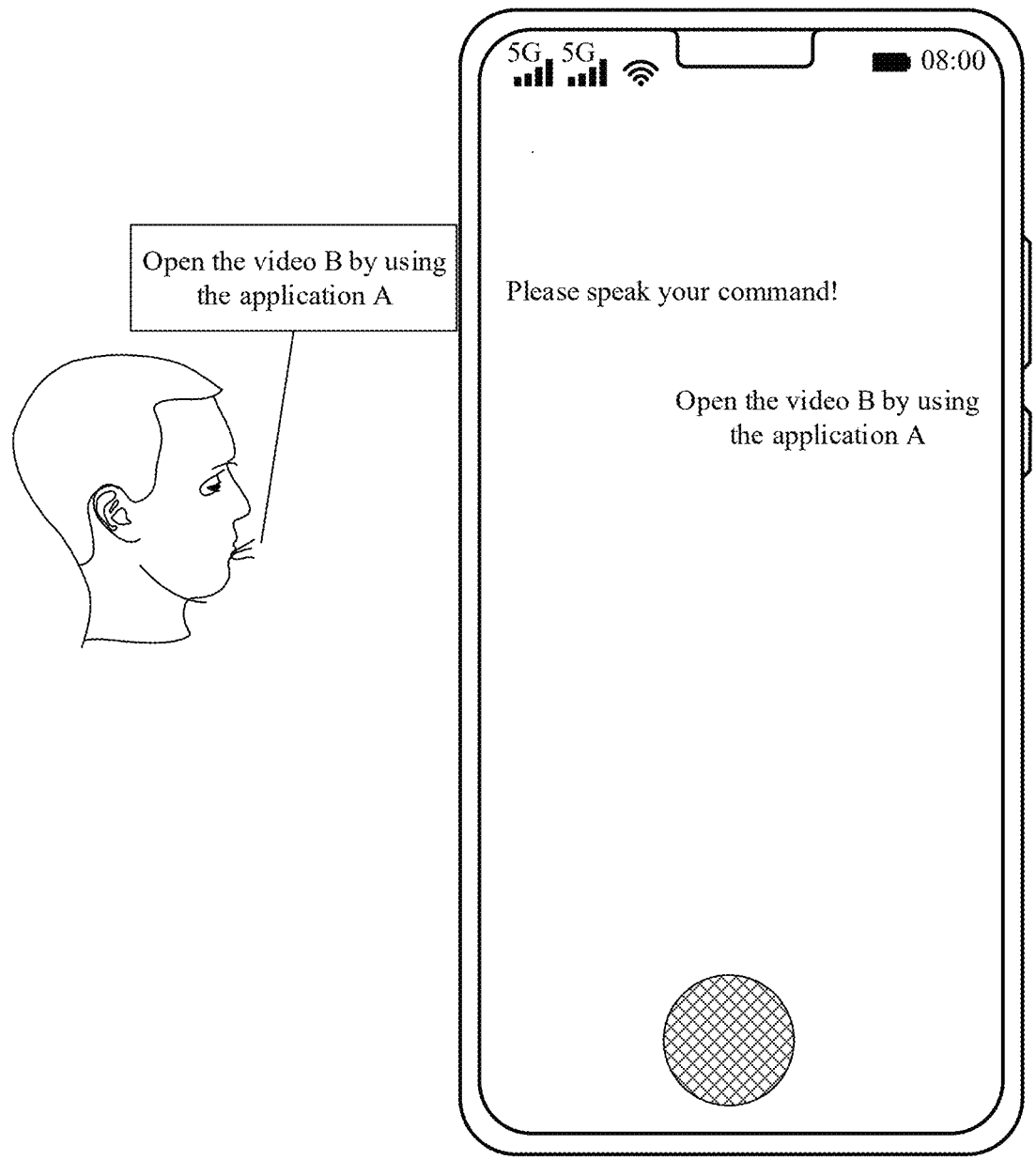
Figure 5D:
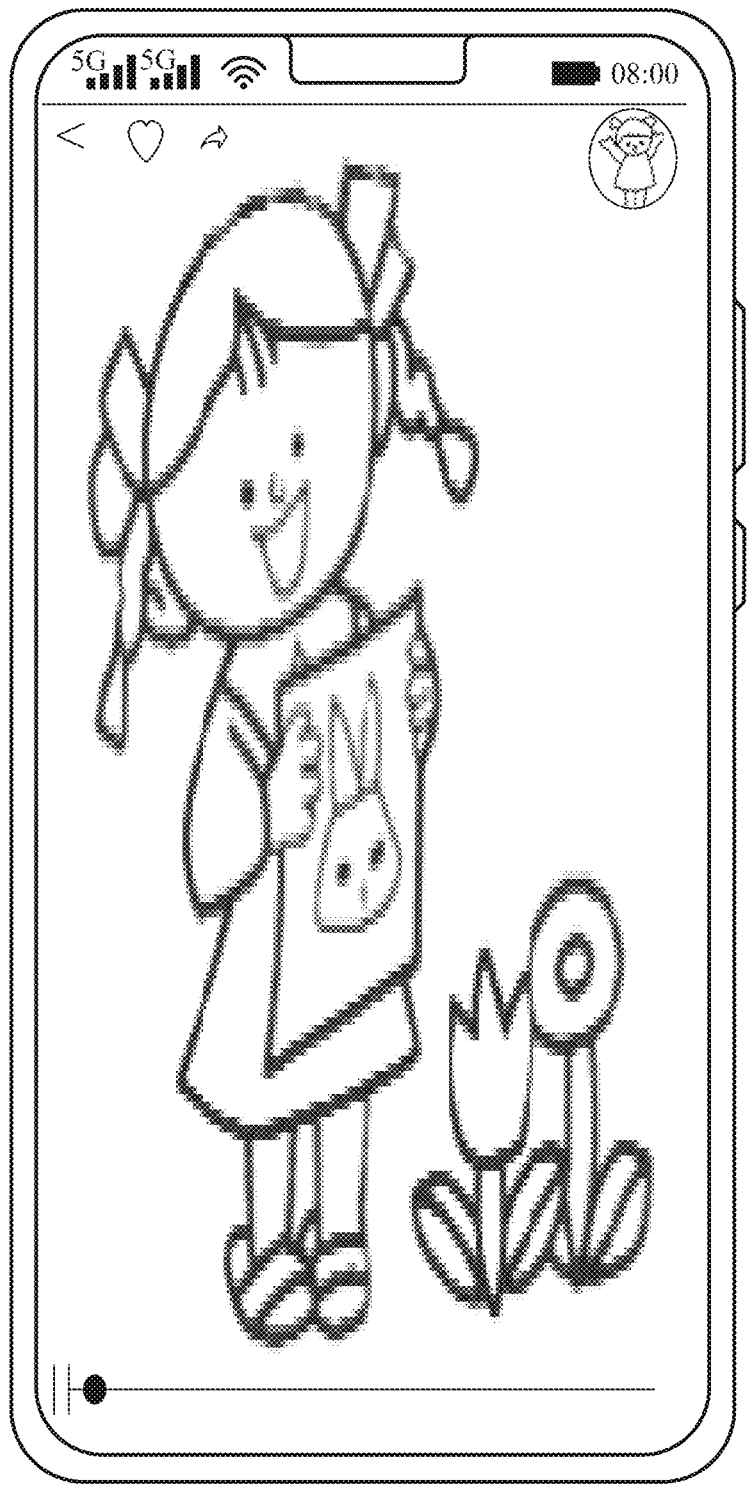

In a second application scenario, the first operation may be a voice instruction that is spoken by the user to the mobile phone and that is used to indicate to play the video source file. Specifically, as shown in FIG. 5(a), the mobile phone may first use a microphone of the mobile phone to receive a wakeup instruction, for example, "Hello, YOYO", of a smart assistant that is spoken by the user, and then the mobile phone displays a smart assistant interface shown in FIG. 5(b). Then, as shown in FIG. 5(c), the smart assistant of the mobile phone invokes the microphone of the mobile phone to obtain and recognize a next voice instruction of the user, for example, "Open the video B by using the application A", and display the voice instruction in the smart assistant interface. Then, as shown in FIG. 5(d), the smart assistant of the mobile phone jumps to a video playback interface of the application A and plays the video B at the first refresh rate. Certainly, in actual application, the wakeup instruction of the voice assistant may be determined based on designs of different mobile phones, and the voice instruction entered/spoken by the user may alternatively be any voice instruction that can indicate that the video B needs to be opened by using the A application.

Figure 6A:
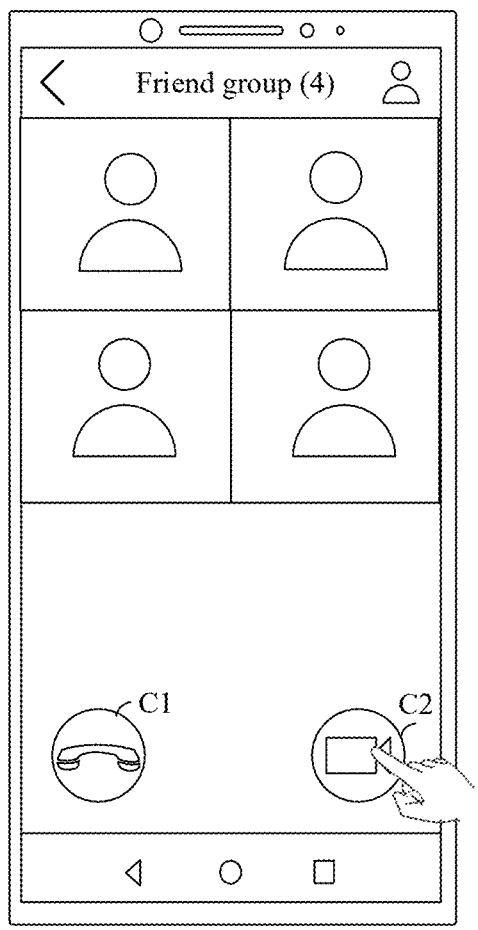
FIG. 6($a$) and FIG. 6($b$) are a schematic diagram of still another video playback scenario according to an embodiment of this application.
Figure 6B:
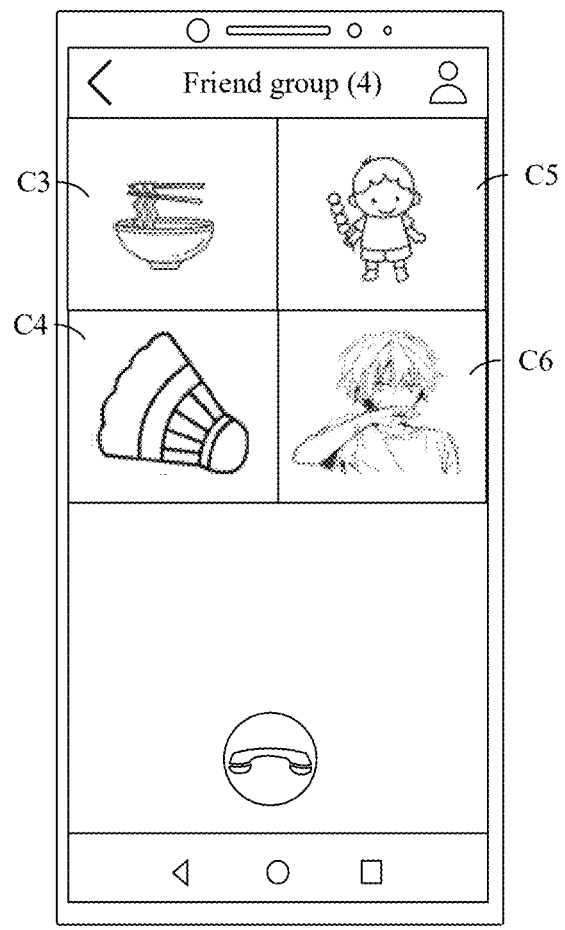

In a third application scenario, the first operation may be a tap operation on a video request decline icon. Specifically, as shown in FIG. 6(a), in a communication group in a social software group, if a member sends a video request to another member, the mobile phone displays a video request decline icon C1 and a video request accept icon C2 in an interface in response to the request. Then, as shown in FIG. 6(b), the mobile phone may display video call interfaces (C3, C4, C5, and C6) of all members and play a video image through a plurality of small screens at the first refresh rate in response to a tap operation on the video request accept icon C2.

Figure 7A:
FIG. 7($a$) and FIG. 7($b$) are a schematic diagram of yet another video playback scenario according to an embodiment of this application.
Figure 7B:
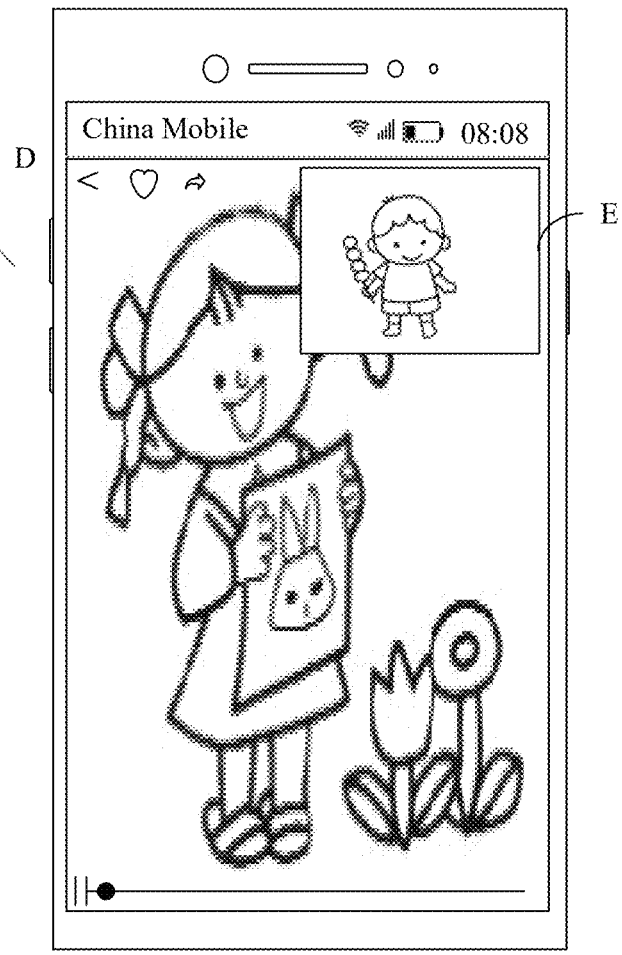

In a fourth application scenario, the first operation may be a tap operation on an icon of a video call request sent by the user to a friend of the user when the user watches a video source file. Specifically, as shown in FIG. 7(a), when the mobile phone plays the video A through an application for watching by the user, the mobile phone displays a video call request icon D in the interface in response to a video call request sent by a mobile phone of another user. Then, if the user taps the video call request icon D, as shown in FIG. 7(b), the mobile phone may display a video call interface E through a small screen at the first refresh rate in response to the tap operation performed by the user on the video call request icon D. It should be noted that when the video A is played by the mobile phone and no video request is received by the mobile phone, the mobile phone needs to determine, based on the refresh rate adjustment method provided in this embodiment of this application, a refresh rate of playing the video A.

Certainly, there are any other feasible video display scenarios in actual application. The foregoing four scenarios are merely examples. This is not specifically limited in this embodiment of this application.

302: The mobile phone obtains the first frame rate of the at least one video source file and the play status of each of the at least one video source file.

The play status includes a playing state or a playing stop state, and the playing stop state may include a pause state or a playing end state. The first frame rate is used in this application to represent an overall frame rate of all of the at least one video source file, and may be specifically determined based on a frame rate of each of the at least one video source file.

Figure 8A:
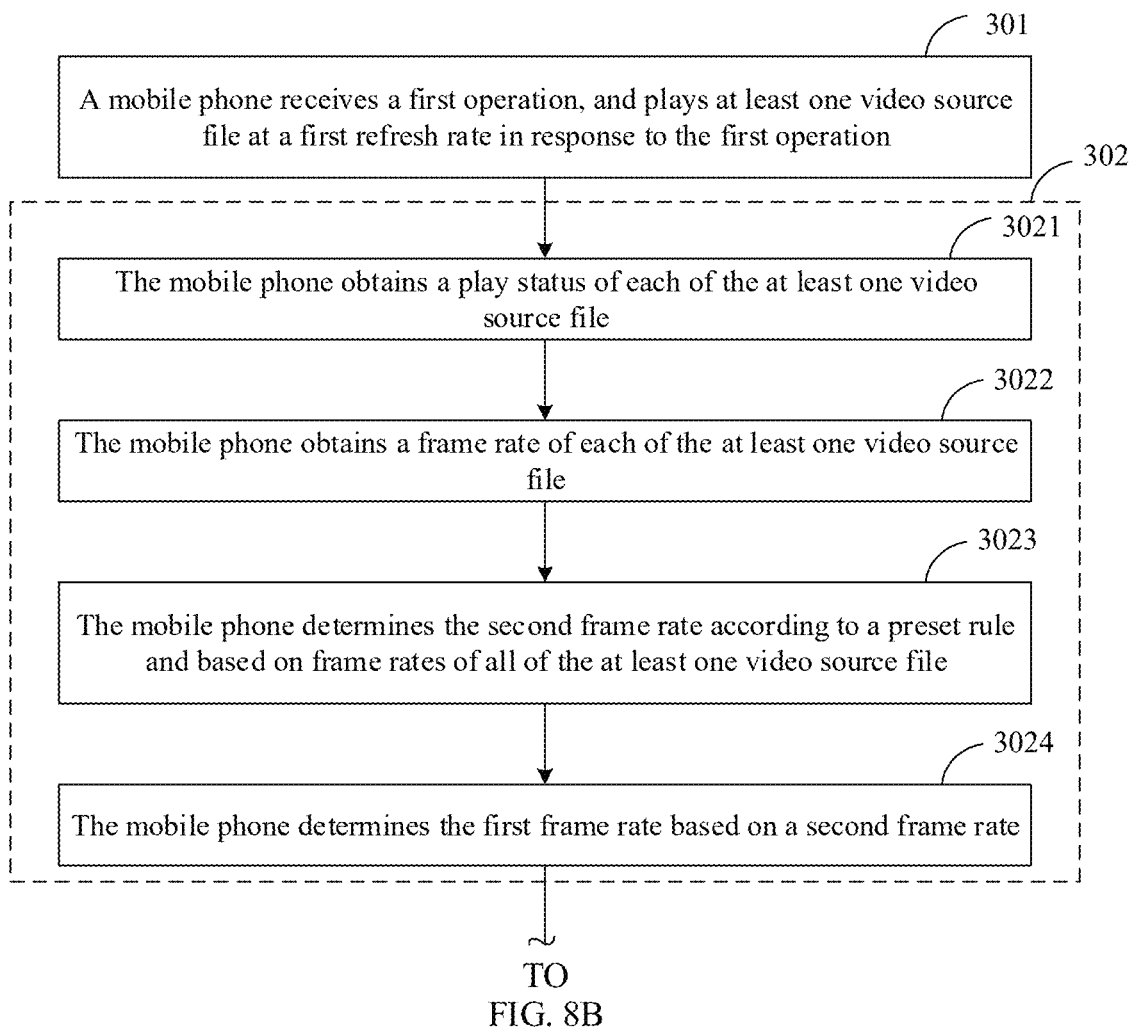
FIG. 8A and FIG. 8B are a schematic flowchart of another refresh rate adjustment method according to an embodiment of this application.

Specifically, with reference to FIG. 3. as shown in FIG. 8A, step 302 may specifically include 3021 to 3024.

3021: The mobile phone obtains the play status of each of the at least one video source file.

For example, the mobile phone may determine the play status of each video source file by listening to a related status parameter of an application for playing the video source file or in any other feasible manner. This is not specifically limited in this application.

3022: The mobile phone obtains a frame rate of each of at least one video source file.

For example, 3022 may be specifically implemented in the following manners:

In a first manner, the mobile phone performs the following operation on each of the at least one video source file, to obtain the frame rate of each of the at least one video source file: When attribute information of a first video source file includes frame rate information, the mobile phone may obtain a frame rate in the attribute information of the first video source file.

The first video source file may be any one of the at least one video source file. In this embodiment of this application, a method in which the mobile phone obtains the frame rate of each of the at least one video source file is described by using an example in which a frame rate of the first video source file is obtained. The following first video source file is the same as that in this embodiment.

In this way, the mobile phone can quickly obtain the frame rate of each of the at least one video source file, and provide data support for subsequent adjustment of the refresh rate.

In a second manner, the mobile phone performs the following operation on each of the at least one video source file, to obtain the frame rate of each of the at least one video source file: When attribute information of a first video source file does not include frame rate information, the mobile phone may search a search platform for the first video source file, to obtain a frame rate of the first video source file from the search platform.

In this way, when the attribute information of the video source file does not include the frame rate information, the mobile phone may quickly obtain the frame rate of each of the at least one video source file to provide data support for subsequent adjustment of the refresh rate.

In a third manner: A frame loss often occurs in some video source files (such as live videos), and therefore an actual frame rate at which the video source file is played is different from the frame rate indicated in the attribute information of the video source file. Therefore, to more accurately obtain the actual frame rate of the video source file, the mobile phone may perform the following operation on each of the at least one video source file, to obtain the frame rate of each of the at least one video source file: When a type of a first video source file is a preset type (for example, a video source file in which frame drop easily occurs such as a live broadcast type), the mobile phone calculates the frame rate of the first video source file based on a characteristic parameter of the first video source file, where the characteristic parameter includes a size, duration, and resolution, and the first video source file is any one of the at least one video source file.

For example, a specific formula in which the frame rate of the first video source file is calculated based on the characteristic parameter of the first video source file may be as follows: Frame rate=Video size/(Duration×Resolution coefficient). The resolution coefficient is determined based on different specifications of resolution. For example, a resolution coefficient corresponding to resolution 720 P is 50, a resolution coefficient corresponding to resolution 480 P is 35, and a resolution coefficient corresponding to resolution 1080 P is 75.

Certainly, the foregoing three manners are merely examples, and there may be any other feasible implementations in actual application. This is not specifically limited in this application.

3023: The mobile phone determines a second frame rate according to a preset rule and based on frame rates of all of the at least one video source file.

The preset rule may be any one of the following three feasible solutions: a first solution in which a maximum frame rate in the frame rates of all of the at least one video source file is used as the second frame rate, a second solution in which an average value of the frame rates of all of the at least one video source file is used as the second frame rate, and a third solution in which when a selection operation performed by the user on the frame rates of all of the at least one video source file is received, a frame rate selected by the user is used as the second frame rate.

An advantage of the first solution is that the second frame rate can be well compatible with the frame rates of all the video source files, thereby ensuring experience of watching all the video source files by the user after the refresh rate of the display is subsequently adjusted based on the first frame rate determined based on the second frame rate. However, if only one of the at least one video source file has a high frame rate, the second frame rate is set to be high, and the refresh rate finally determined based on the first frame rate determined based on the second frame rate may be high, thereby causing an unnecessary increase in energy consumption of the mobile phone.

An advantage of the second solution is that the average value of the frame rates of all the video source files can be used to represent the frame rates of all the video source files to some extent, and the final second frame rate is not too high when only an individual frame rate is large in the frame rates of all the video source files, thereby reducing energy consumption of the mobile phone.

An advantage of the third solution is that selection of the second frame rate is completely determined by the user, and the final refresh rate of the display is controlled by the user, so that user requirements can be well ensured.

For example, the at least one video source file includes a first video source file, a second video source file, and a third video source file. In an implementation of the third solution, when playing the at least one video source file, the mobile phone may display a pop-up box on the display, where the pop-up box may include three control options: "Frame rate –60 Hz of the first video source file", "Frame rate –50 Hz of the second video source file", and "Frame rate –55 Hz of the third video source file". The user may choose to tap one of the control options based on a user requirement, and the mobile phone can determine the final second frame rate in response to the tap operation of the user. In another implementation of the third solution, the mobile phone may first issue a voice instruction to the user to prompt the user to speak the second frame rate selected by the user, for example, "Please speak which currently displayed video that you expect to use to represent all displayed videos", then receive a voice instruction spoken by the user based on a user requirement (for example, "I select a frame rate of the ancient idol drama as the frame rates of all the videos"), and finally select, as the second frame rate after recognizing the voice instruction, the frame rate of the video source file that is determined by the user.

3024: The mobile phone determines the first frame rate based on the second frame rate.

Figure 8B:
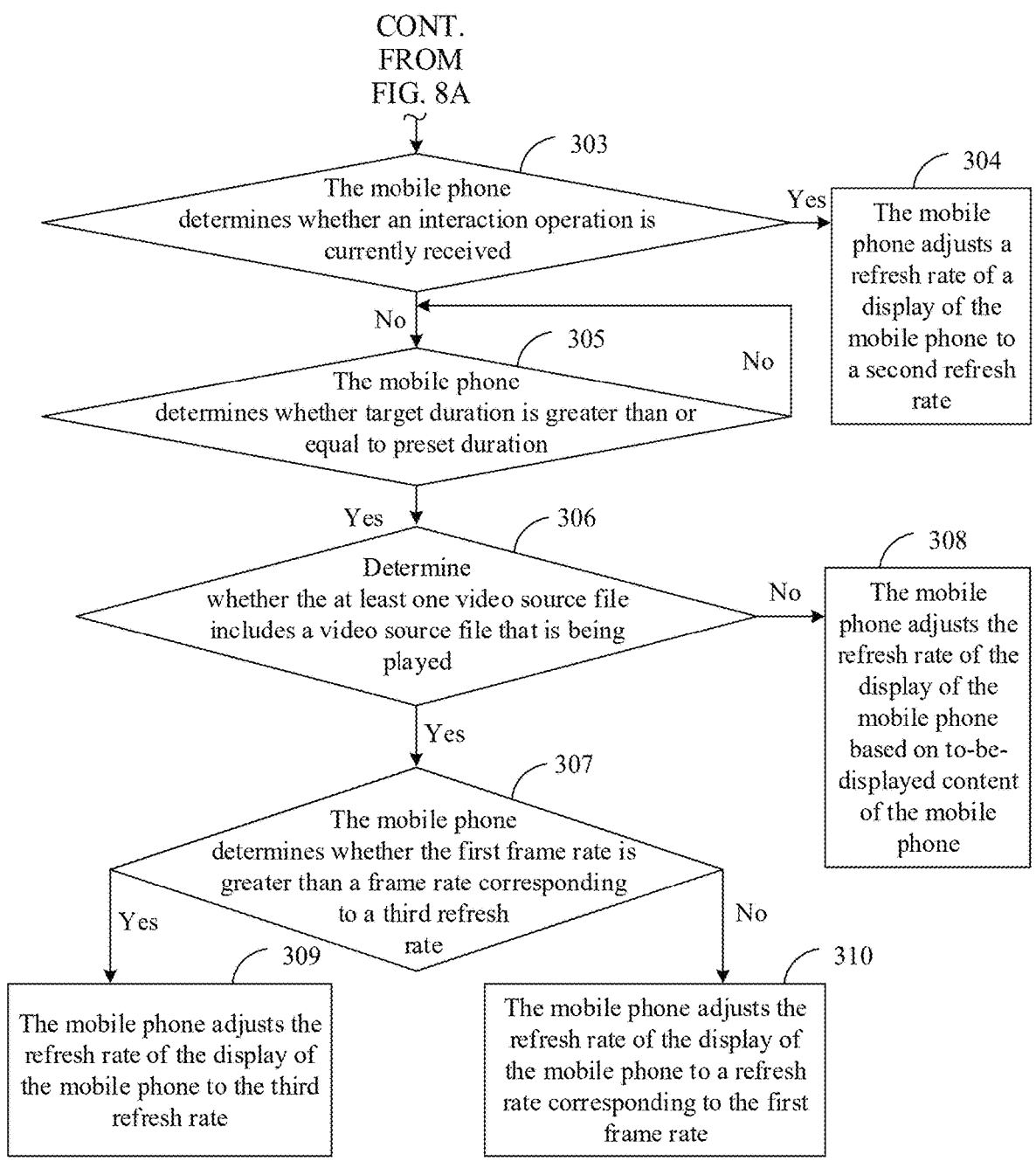

Based on the foregoing technical solution, the first frame rate of the at least one video source file currently played by the electronic device is determined according to a specific rule, and the first frame rate is used to represent the frame rates of all of the at least one video source file. Subsequently, the refresh rate of the display that is determined by the electronic device based on the first frame rate can match all the video source files to some extent, so that a watching effect of the user is better. It should be noted that step 3021 may be before or after any one of steps 3022 to 3024. FIG. 8A and FIG. 8B show only a possible implementation, and may be any other feasible implementation in actual application.

In an implementation, the second frame rate may be directly determined as the first frame rate.

Figure 9A:
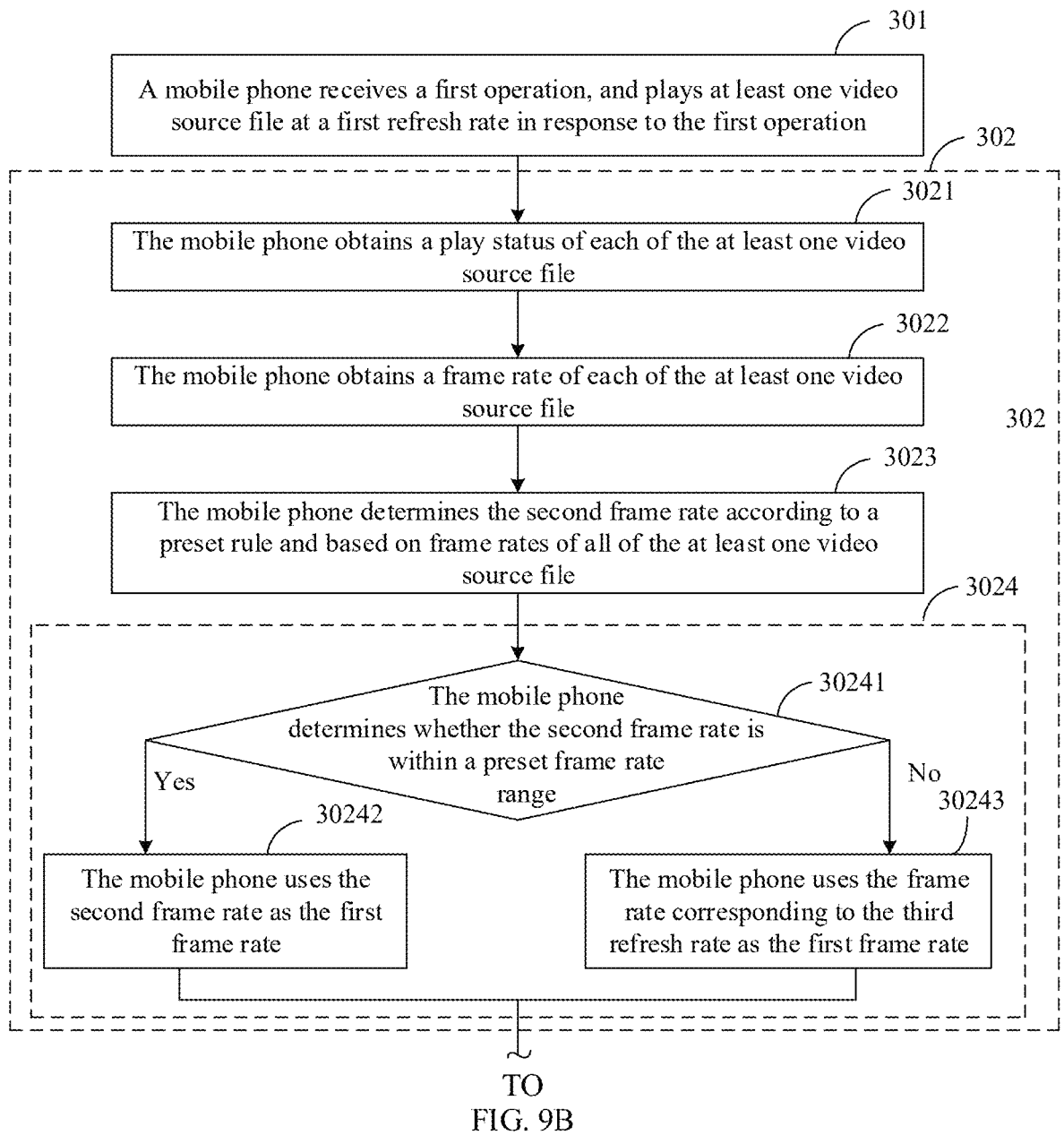
FIG. 9A and FIG. 9B are a schematic flowchart of still another refresh rate adjustment method according to an embodiment of this application.
Figure 9B:
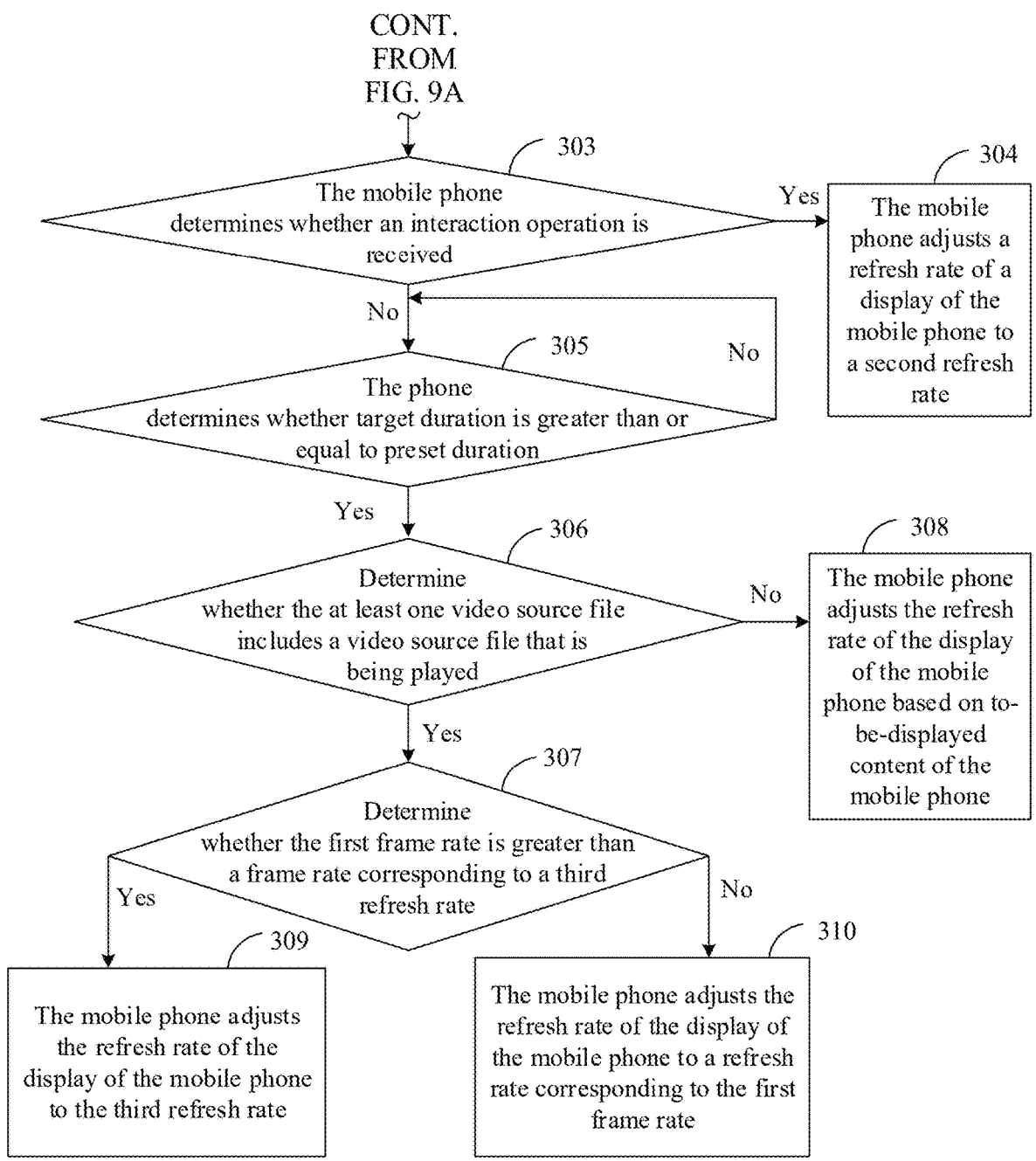

In another implementation, with reference to FIG. 8A and FIG. 8B, refer to FIG. 9B, step 3024 may include 30241 to 30243.

30241: The mobile phone determines whether the second frame rate is within a preset frame rate range.

When determining that the second frame rate is within the preset frame rate range, the mobile phone performs 30242. When determining that the second frame rate is not within the preset frame rate range, the mobile phone performs 30243. A minimum value in the preset frame rate range may be a frame rate (24 Hz) of the video source file at which a human eye can perceive obvious picture switching (stalling) when the video source file is played, and a maximum value in the preset frame rate range may be a preset maximum frame rate (for example, 400 Hz).

If the second frame rate is not within the preset frame rate range or does not exist, it indicates that there may be improperness of a rule of obtaining the second frame rate in an obtaining process or an error existing when the frame rate of the video source is obtained. The second frame rate obtained in this case is abnormal and does not belong to a frame rate range of a normal video source. Therefore, the second frame rate in this case cannot be used as a basis for determining the first frame rate.

In addition, step 30241 may not exist in actual application. The mobile phone directly performs 30242 when the second frame rate is within the preset frame rate range, and performs 30243 when the second frame rate is not within the preset frame rate range.

30242: The mobile phone uses the second frame rate as the first frame rate.

30243: The mobile phone uses a frame rate corresponding to the third refresh rate as the first frame rate.

The third refresh rate is less than or equal to a maximum refresh rate supported by the display of the mobile phone, and the third refresh rate may be a pre-configured refresh rate, for example, preset in the mobile phone after a proper refresh rate is determined based on related data that the user watches the video in actual application (for example, a maximum frame rate in frame rates of all videos watched by a plurality of users), or may be set by the mobile phone in response to a setting operation of the user.

In this way, according to the technical solution corresponding to 30241 to 30243, after the second frame rate is preliminarily determined based on the frame rates of all of the at least one video source file, the second frame rate is determined as the first frame rate only when the second frame rate is within a proper frame rate range (the preset frame rate range). This ensures that the electronic device (for example, a mobile phone) smoothly plays the video source file, and ensures watching experience of the user (without perceiving stalling) in the playback process. When the second frame rate is not within the preset frame rate range, the frame rate corresponding to the third refresh rate that is set in advance is used as the first frame rate, thereby ensuring smooth playback of the video source file by the electronic device.

The pre-configured refresh rate may be obtained based on a result of actually investigating a large quantity of videos and electronic devices, so that the electronic device plays the video source file at the third refresh rate, thereby ensuring user experience of the electronic device. For example, when the electronic device is a mobile phone dedicated to games, because a frame rate of a game video is high, the third refresh rate may be pre-configured to be more than 60 frames. For another example, when the electronic device is a mobile phone dedicated to photographing, because a video often played by the mobile phone may not have a high frame rate, the third refresh rate may be pre-configured to be approximately or even less than 60 frames.

Figure 10A:
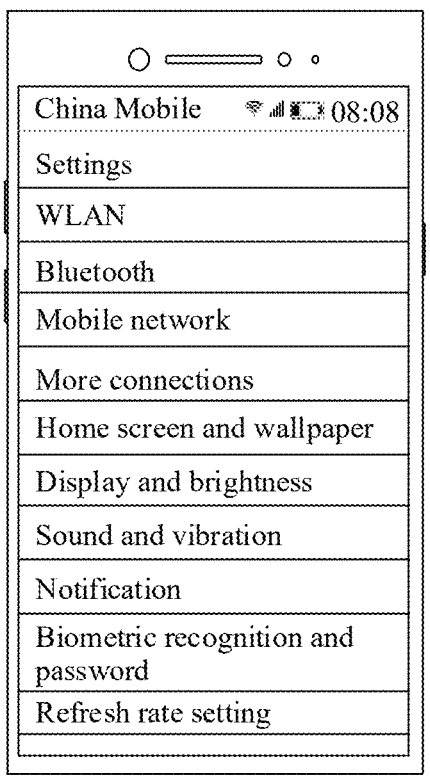
FIG. 10($a$), FIG. 10($b$), and FIG. 10($c$) are a schematic diagram of a selection scenario of a third refresh rate according to an embodiment of this application.
Figure 10B:
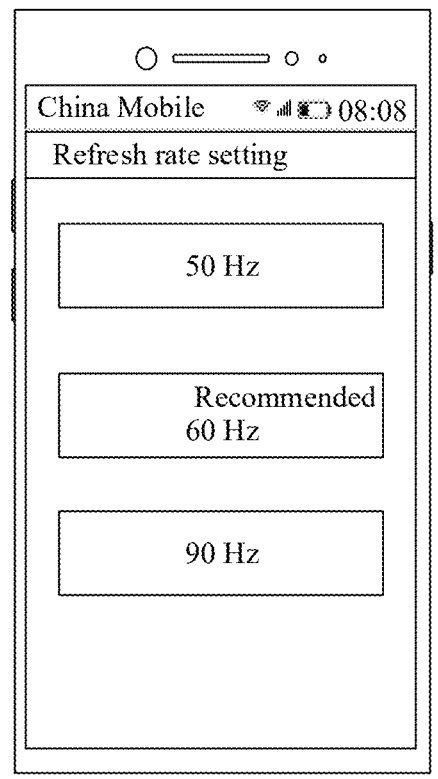
Figure 10C:
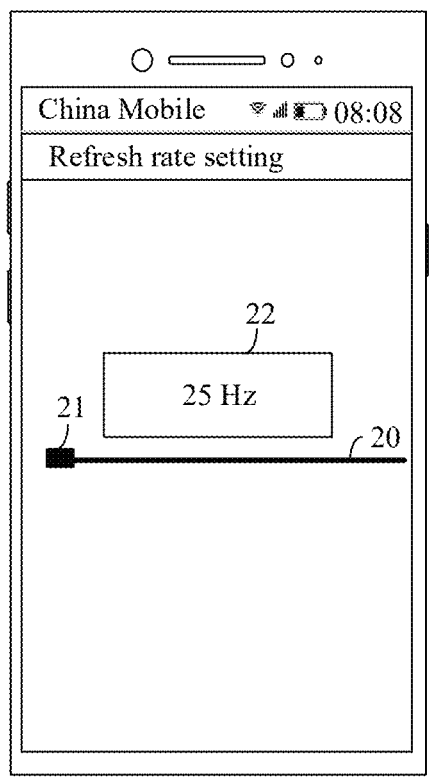

For a manner in which the mobile phone sets the third refresh rate in response to the setting operation of the user, there may be the following possible scenarios:

In a first possible scenario, the user may set the third refresh rate through a setting function of the mobile phone. Specifically, as shown in FIG. 10(*a*), the mobile phone may receive a tap operation performed by the user on a third refresh rate setting option in a setting interface. Then, as shown in FIG. 10(*b*), in response to the tap operation of the user, the mobile phone may display several values ("50 Hz", "60 Hz", and "90 Hz" are used as examples in the figured) that can be set for the third refresh rate. Considering a purpose of prolonging use time of the mobile phone, a mobile phone manufacturer may recommend the user to select an option that can not only ensure use experience but also does not consume very much power, for example, "Recommended" may be marked in the upper right corner of the "60 Hz" shown in FIG. 10(*b*) to give the user some selection suggestion. As shown in FIG. 10(*c*), in response to the tap operation of the user, the mobile phone may display a slider 20 on which a slider bar 21 may exist, and a preset area 22 may exist above the slider 20 for displaying a refresh rate corresponding to a current location of the slider bar 21. When the slider bar 21 is slid to a leftmost end of the slider 20 by the user, a refresh rate corresponding to a location of the slider bar 21 may be a preset minimum value (for example, 25 Hz). When the slider bar 21 slides to the right, the corresponding frame rate gradually increases, and when the slider bar 21 slides to a rightmost end of the slider, the corresponding refresh rate is a maximum refresh rate (for example, 144 Hz) supported by the mobile phone.

In a second possible scenario, the user may set the third refresh rate in a setting interface of an application for playing a video source file. Specifically, in response to a tap operation performed by the user on a setting option corresponding to the third refresh rate in the setting interface of the application, the mobile phone may display all optional values of third refresh rates (which can be similar to all optional values of third refresh rates in FIG. 10(*b*)) or a selection control (which can be similar to the slider and slider bar in FIG. 10(*c*)) of a third refresh rate. Then, the mobile phone determines the third refresh rate in response to the related operation of the user. For the specific implementation, refer to the descriptions in the first scenario. Details are not described herein again.

In a third possible scenario, the user may set the third refresh rate through a smart assistant of the mobile phone. Specifically, the mobile phone may first display a smart assistant interface in response to a wakeup instruction of the smart assistant that is spoken by the user. Then, in response to the related voice instruction for setting the third refresh rate that is spoken by the user (for example, "setting the third refresh rate (in actual application, to facilitate user understanding, the third refresh rate may be a normal refresh rate) to 60 Hz"), the mobile phone determines the third refresh rate. Because the smart assistant has a specific AI function, the related voice instruction for setting the third refresh rate may be any recognizable voice instruction. This is not specifically limited in this application.

Figure 11A:
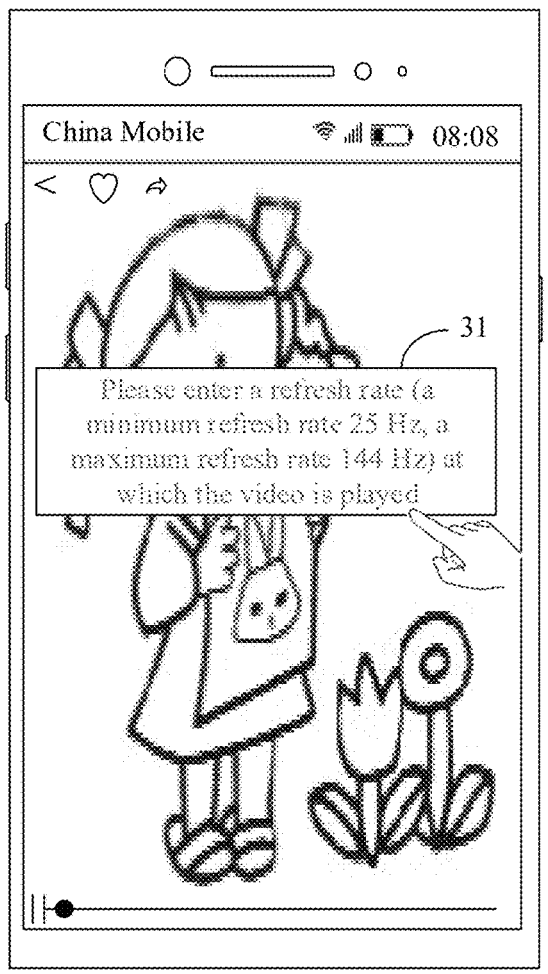
FIG. 11($a$) and FIG. 11($b$) are a schematic diagram of another selection scenario of a third refresh rate according to an embodiment of this application.
Figure 11B:
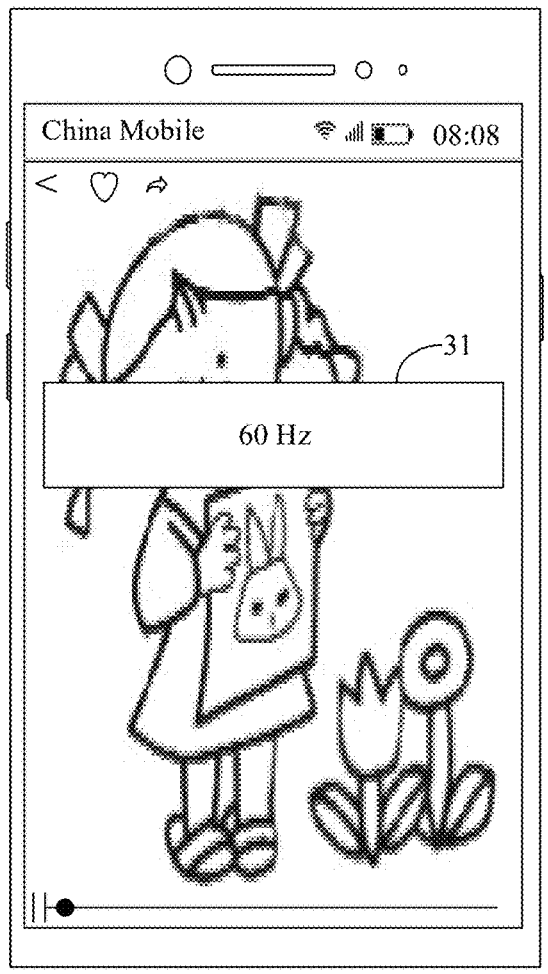

In a fourth possible scenario, when starting to play the video source file, the mobile phone may guide the user to set the third refresh rate. Specifically, as shown in FIG. 11(*a*), the mobile phone may display a pop-up window 31 when starting to play the video source file, where the pop-up window may include "Please enter a refresh rate (a minimum refresh rate 25 Hz, a maximum refresh rate 144 Hz) at which the video is played". Content in ( ) is intended to prompt for a feasible range of the refresh rate entered by the user, the minimum refresh rate 25 Hz is a refresh rate corresponding to a video frame rate at which a human eye cannot perceive picture switching, and the maximum refresh rate 144 Hz is a maximum refresh rate that can be displayed by the display of the mobile phone. The prompt displayed at the beginning of the pop-up window can disappear after the user taps the inside of the pop-up window. Then, the mobile phone may determine the third refresh rate based on a value entered by the user in the pop-up window, for example, "60 Hz" shown in FIG. 11(*b*). Certainly, the pop-up window may alternatively be any other feasible type, provided that the user can enter or select a selection value of the third refresh rate.

Certainly, there may also be any other possible scenario and any other feasible setting manner of the third refresh rate in actual application. The related descriptions of the foregoing four scenarios are merely examples. An actual setting process is not specifically limited.

303: The mobile phone determines whether an interaction operation is currently received.

The interaction operation may be an interaction operation (for example, a sliding operation or a bullet sending operation) on a playback interface of any one of the at least one video source file, or may be an interaction operation (for example, a voice instruction or a button pressing operation) on a specific video source file.

If the mobile phone receives the interaction operation, the mobile phone performs 304. If the mobile phone does not receive the interaction operation, the mobile phone performs 305.

For example, the interaction operation includes but is not limited to any one of the following: a screen touch and sliding operation, a tap operation, a voice control operation, a button pressing operation, a mid-air gesture, a remote control operation, a mouse operation, a keyboard operation, a visual control operation, a facial expression recognition operation.

In actual application, the mobile phone may determine, based on various sensors disposed in the mobile phone, such as a touch sensor and a pressure sensor under a button, whether the mobile phone receives an interaction operation.

Because the interaction operation mostly requires a specific animation effect, and the animation effect usually requires a high frame rate, the mobile phone also needs to determine, when determining a refresh rate to be used to play the video source file, whether the interaction operation is received.

In addition, step 303 may not be performed in actual application. The mobile phone may directly perform 304 when the mobile phone currently receives the interaction operation, and may perform 305 when the mobile phone does not currently receives the interaction operation.

304: The mobile phone adjusts the refresh rate of the display of the mobile phone to the second refresh rate.

The second refresh rate is less than or equal to a maximum refresh rate of the display of the electronic device, and the frame rate corresponding to the second refresh rate is within a preset range of a frame rate required for an animation effect corresponding to the interaction operation. The second refresh rate may be preset by the mobile phone, or may be set by the mobile phone in response to a setting operation of the user. A specific implementation of setting the second refresh rate is the same as that of setting the third refresh rate. For details, refer to the foregoing descriptions of a specific scenario of setting the third refresh rate. The details are not described herein again.

In a possible implementation, when the second refresh rate is a preset refresh rate, the frame rate corresponding to the second refresh rate may be a maximum value in a preset range of a frame rate required for the animation effect corresponding to the interaction operation, to make interaction experience better in a process in which the user performs the interaction operation. For example, if the preset range is 60 Hz to 90 Hz, the second refresh rate may be a refresh rate corresponding to the frame rate of 90 Hz. In this way, a refresh rate corresponding to the maximum value in the preset range of the frame rate required for the animation effect corresponding to the interaction operation is used as the second refresh rate, so that the animation effect presented by the interaction operation performed by the user in the process in which the user watches the video source file played by the electronic device can be smoother, and interaction experience of the user can be better.

In a possible design, in actual application, after controlling the electronic device to play a video, the user is more likely to further perform a specific interaction operation based on preferences of the user. In this case, the first operation may be considered as an interaction operation, and the first refresh rate may be set to be the same as the second refresh rate. In this way, an action of switching the refresh rate once is reduced, and some visual discomfort caused because the user perceives a change of the refresh rate in the video watching process is avoided, thereby improving user experience.

In addition, in a possible implementation, because the frame rate of the animation effect corresponding to the interaction operation in actual application usually needs to be greater than the frame rate of the video source file, in this application, the third refresh rate is less than the second refresh rate.

305: The mobile phone determines whether target duration from a moment of receiving the first operation or a previous interaction operation on the video source file to a current moment is greater than or equal to preset duration.

When the mobile phone determines that the target duration is greater than or equal to the preset duration, the mobile phone performs 306. When the mobile phone determines that the target duration is less than the preset duration, the mobile phone performs 305 again. Step 305 may be specifically understood as determining whether the mobile phone does not receive the interaction operation again within preset duration from a time point of receiving the first operation or a previous interaction operation.

Step 305 is performed to achieve the following objective: Because the mobile phone needs to determine, based on the interaction operation performed by the user on the video source file, the first frame rate, and the play status of the video source file, the refresh rate for playing the video source file, refresh rates determined when there is an interaction operation and when there is no interaction operation are different. If the user has continuously performs the interaction operation at an interval of few minutes, the mobile phone may repeatedly adjust the refresh rate, which not only increases a possibility that the user perceives a change of the refresh rate (reduces user experience), but also increases power consumption of the mobile phone. Therefore, preset duration may be set herein. If the user does not perform the interaction operation again within the preset duration after performing the first operation or the interaction operation, it indicates that the user does not perform the interaction operation quickly with a high probability. In this case, the refresh rate of the display of the mobile phone can be reliably increased to a corresponding refresh rate when there is no interaction operation.

For example, an implementation of step 305 may be that the mobile phone sets a timer that keeps timing. The timer resets to restart timing when the mobile phone receives the first operation or each time the mobile phone receives the interaction operation. The mobile phone may determine, based on the timing time of the timer, whether the mobile phone does not receive the interaction operation again within the preset duration from the time point of receiving the first operation or the previous interaction operation. If the timing duration of the timer reaches the preset duration, it indicates that the mobile phone does not receive the interaction operation again within the preset duration from the time point of receiving the first operation or the previous interaction operation. If the timing duration of the timer does not reach the preset duration, it indicates that the mobile phone does not receive the interaction operation again within the preset duration from the time point of receiving the first operation or the previous interaction operation.

In addition, step 305 may not be performed in actual application. The mobile phone directly performs 306 when the mobile phone determines that the target duration is greater than or equal to the preset duration, and the mobile phone performs 305 again when the mobile phone determines that the target duration is less than the preset duration.

306: The mobile phone determines whether the at least one video source file includes a video source file that is being played.

When the mobile phone determines that the at least one video source file includes the video source file that is being played, the mobile phone performs 307. When the mobile phone determines that the at least one video source file does not include the video source file that is being played, the mobile phone performs 308.

Step 306 has the following meanings: If the current mobile phone does not need to play any video source file and does not need to play an animation corresponding to the interaction operation, the display can be refreshed only when there is to-be-displayed content, and is not refreshed when there is no to-be-displayed content, to implement power saving, and improve user experience.

In addition, step 306 may not performed in actual application. The mobile phone directly performs 307 when the mobile phone determines that the at least one video source file includes the video source file that is being played, and the mobile phone performs 308 when the mobile phone determines that the at least one video source file does not include the video source file that is being played.

307: The mobile phone determines whether the first frame rate is greater than a frame rate corresponding to the third refresh rate.

When the mobile phone determines that the first frame rate is greater than the frame rate corresponding to the third refresh rate, the mobile phone performs 309. When the mobile phone determines that the first frame rate is less than or equal to the frame rate corresponding to the third refresh rate, the mobile phone performs 310.

When the first frame rate is greater than the frame rate corresponding to the third refresh rate, it indicates that a best playback effect of the video source file (playing the at least one video source file at the refresh rate corresponding to the first frame rate) actually exceeds a user requirement. Therefore, in this case, the at least one video source file is directly played at the third refresh rate, so that a user requirement can be met with low power consumption (step 309).

When the first frame rate is less than or equal to the frame rate corresponding to the third refresh rate, it indicates that the refresh rate required by the user can fully achieve the best playback effect of the video source file. Therefore, in this case, the at least one video source file can be played at the refresh rate corresponding to the first frame rate (step 310), which not only improves user experience, but also avoids an invalid frame refresh and saves power.

In addition, step 307 may not be performed in actual application. The mobile phone directly performs 309 when the mobile phone determines that the first frame rate is greater than the frame rate corresponding to the third refresh rate, and the mobile phone performs 310 when the mobile phone determines that the first frame rate is less than or equal to the frame rate corresponding to the third refresh rate.

308: The mobile phone adjusts the refresh rate of the display of the mobile phone based on to-be-displayed content of the mobile phone.

Specifically, in this case, if there is no to-be-displayed content on the mobile phone, the refresh rate of the display may be 0, which greatly saves power.

309: The mobile phone adjusts the refresh rate of the display of the mobile phone to the third refresh rate.

310: The mobile phone adjusts the refresh rate of the display of the mobile phone to the refresh rate corresponding to the first frame rate.

According to the technical solution provided in this embodiment of this application, in a process of playing the video source file, the electronic device adjusts the refresh rate of the display based on three factors, that is, the first frame rate of the at least one video source file currently played, the play status of each video source file, and whether the user operation is received. In the three factors, the frame rate of the video source file determines a proper refresh rate required when the video source file is played, whether the video source file is being played directly determines whether there is content that needs to be displayed by the display through refreshing currently, and the animation effect required for the interaction operation performed by the user can be displayed without stalling only when there is a higher refresh rate. Therefore, after the three factors are combined in this application, the refresh rate of the display at which the video source file is played can be properly adjusted, so that the refresh rate of the display of the electronic device and the refresh rate required in the video source file playback process are closer or equal. Whether the video source file is played smoothly is determined by a similarity between the refresh rate required in the video source file playback process and the refresh rate of the display. A closer similarity indicates a smoother playback process, more power-saving, and better user experience. Therefore, in conclusion, according to the technical solution provided in this application, user experience can be improved when the electronic device plays the video source file.

It may be understood that, to implement the foregoing functions, the device or the like includes corresponding hardware structures and/or software modules for performing the functions. A person skilled in the art should be easily aware that units, algorithms, and steps in the examples described with reference to embodiments disclosed in this specification can be implemented in embodiments of this application in a form of hardware or a combination of hardware and computer software. Whether the functions are performed by hardware or computer software driven hardware depends on particular applications and design constraints of the technical solutions. A person skilled in the art may use different methods to implement the described functions for each particular application, but it should not be considered that the implementation goes beyond the scope of embodiments of this application.

In embodiments of this application, the electronic device may be divided into functional modules based on the foregoing method examples, for example, each functional module may be obtained through division for each corresponding function, or two or more functions may be integrated into one processing module. The integrated module may be implemented in a form of hardware or a software functional module. It should be noted that division into the modules in embodiments of this application is an example and is merely logical function division, and may be other division mode in an actual implementation.

Figure 12:
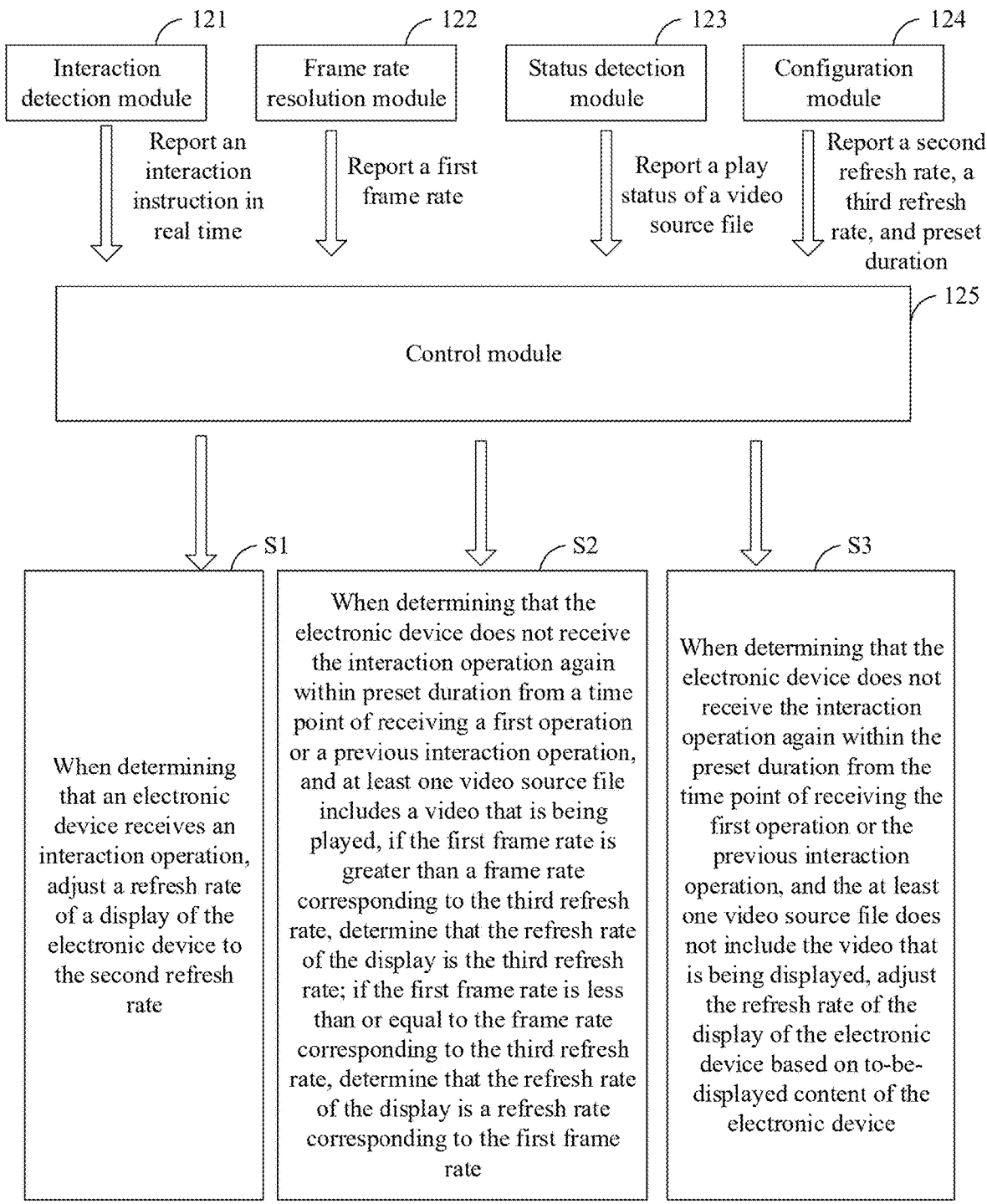
FIG. 12 is a schematic diagram of a structure of another electronic device according to an embodiment of this application.

When each functional module is obtained through division based on each corresponding function, as shown in FIG. 12, an embodiment of this application provides an electronic device 12, including an interaction detection module 121, a frame rate resolution module 122, a status detection module 123, a configuration module 124, and a control module 125. The modules in the electronic device 12 may be combined to implement the refresh rate adjustment method provided in the foregoing embodiment.

Refer to FIG. 12. A specific working principle is as follows:

After a user performs a first operation on the electronic device 12, the electronic device 12 starts playing at least one video source file at a first refresh rate in response to the first operation. Then, the interaction detection module 121, the frame rate resolution module 122, the status detection module 123, the configuration module 124, and the control module 125 are enabled by the electronic device.

The interaction detection module 121 reports, to the control module 125 in real time, an interaction instruction received by the electronic device.

The frame rate resolution module 122 obtains a first frame rate of the at least one video source file and report the first frame rate to the control module 125, that is, obtains the first frame rate of the at least one video source file in step 302 in the foregoing embodiment. This may specifically include steps such as 3022, 3023, and 3024 (including 30241 to 30243) in the foregoing embodiment.

The status detection module 123 reports a play status of each of the at least one video source file to the control module, that is, obtaining the play status of each of the at least one video source file in step 302 in the foregoing embodiment.

The configuration module 124 reports a second refresh rate, a third refresh rate, and preset duration to the control module 125. Specifically, the second refresh rate and the third refresh rate may be preset in the configuration module 124. Alternatively, the configuration module 124 may perform a specific process of setting the second refresh rate and the third refresh rate by the user in the foregoing embodiment.

The control module 125 determines a refresh rate based on all data reported by the interaction detection module 121, the frame rate resolution module 122, the status detection module 123, and the configuration module 124, and may specifically perform steps 303 to 310 in the foregoing embodiment. As shown in FIG. 12, the following cases are specifically included.

S1: When determining that the electronic device receives an interaction operation, adjust a refresh rate of a display of the electronic device to the second refresh rate.

S2: When determining that the electronic device does not receive the interaction operation again within preset duration from a time point of receiving the first operation or a previous interaction operation, and the at least one video source file includes a video that is being played, if the first frame rate is greater than a frame rate corresponding to the third refresh rate, determine that the refresh rate of the display is the third refresh rate; and if the first frame rate is less than or equal to the frame rate corresponding to the third refresh rate, determine that the refresh rate of the display is a refresh rate corresponding to the first frame rate.

S3: When determining that the electronic device does not receive the interaction operation again within the preset duration from the time point of receiving the first operation or the previous interaction operation, and the at least one video source file does not include the video that is being displayed, adjust the refresh rate of the display of the electronic device based on to-be-displayed content of the electronic device.

A specific manner in which the modules in the electronic device in the foregoing embodiment perform operations has been described in detail in the embodiment of the refresh rate adjustment method in the foregoing embodiments. Details are not described herein again. For related beneficial effects of the electronic device, refer to related beneficial effects of the foregoing refresh rate adjustment method. Details are not described herein again.

An embodiment of this application further provides an electronic device. The electronic device includes a display, a memory, and one or more processors. The display and the memory are coupled to the processor. The memory stores computer program code, the computer program code includes computer instructions, and when the computer instructions are executed by the processor, the electronic device is enabled to perform the refresh rate adjustment method provided in the foregoing embodiment. For a specific result of the electronic device, refer to the structure of the electronic device 100 shown in FIG. 1.

Specifically, when the computer instructions are executed by the processor, the electronic device is enabled to perform the following steps: The electronic device receives a first operation, where the first operation is used to trigger the electronic device to play at least one video source file. In response to the first operation, the processor controls the display to play the at least one video source file at a first refresh rate, and obtain a first frame rate of the at least one video source file and a play status of each of the at least one video source file, where the play status includes a playing state or a playing stop state, and the first refresh rate is less than or equal to a maximum refresh rate of the display of the electronic device. When the electronic device receives an interaction operation performed by a user in a playback interface of any one of the at least one video source file, the processor adjusts the refresh rate of the display of the electronic device to a second refresh rate, where the second refresh rate is less than or equal to the maximum refresh rate of the display of the electronic device, and a frame rate corresponding to the second refresh rate is within a preset range of a frame rate required for an animation effect corresponding to the interaction operation. When the electronic device does not receive the interaction operation again within preset duration from a time point of receiving the first operation or a previous interaction operation, and the at least one video source file includes a video source file that is being played, if the first frame rate is greater than a frame rate corresponding to a third refresh rate, the processor adjusts the refresh rate of the display of the electronic device to the third refresh rate. If the first frame rate is less than or equal to the frame rate corresponding to the third refresh rate, the controller adjusts the refresh rate of the display of the electronic device to a refresh rate corresponding to the first frame rate, where the third refresh rate is less than or equal to the maximum refresh rate of the display of the electronic device.

Optionally, when the computer instructions are executed by the processor, the electronic device is enabled to further perform the following step: If the electronic device does not receive the interaction operation again within the preset duration from the time point of receiving the first operation or the previous interaction operation, and the at least one video source file does not include the video source file that is being played, the processor adjusts the refresh rate of the display of the electronic device based on to-be-displayed content of the electronic device.

Optionally, the first refresh rate is equal to the second refresh rate.

Optionally, when the computer instructions are executed by the processor, the electronic device is enabled to specifically perform the following steps: The processor obtains a frame rate of each of the at least one video source file. The processor uses a maximum frame rate in frame rates of all of the at least one video source file as a second frame rate.

Alternatively, the processor uses an average value of frame rates of all of the at least one video source file as a second frame rate. Alternatively, when receiving a selection operation performed by the user on frame rates of all of the at least one video source file, the processor uses a frame rate selected by the user as a second frame rate. The processor determines the first frame rate based on the second frame rate.

Optionally, when the computer instructions are executed by the processor, the electronic device is enabled to specifically perform the following step: If the second frame rate is within a preset frame rate range, the processor uses the second frame rate as the first frame rate.

Optionally, when the computer instructions are executed by the processor, the electronic device is enabled to further specifically perform the following step: If the second frame rate is not within the preset frame rate range, the processor uses the frame rate corresponding to the third refresh rate as the first frame rate.

Optionally, when the computer instructions are executed by the processor, the electronic device is enabled to specifically perform the following steps: The processor performs the following operations on each of the at least one video source file, to obtain the frame rate of each of the at least one video source file: The processor obtains a frame rate in attribute information of a first video source file. Alternatively, the processor searches a search platform for the first video source file, to obtain a frame rate of the first video source file from the search platform. Alternatively, the processor calculates the frame rate of the first video source file based on a characteristic parameter of the first video source file, where the characteristic parameter includes a size, duration, and resolution, and the first video source file is any one of the at least one video source file.

Optionally, the second refresh rate and the third refresh rate are pre-configured refresh rates. Alternatively, the second refresh rate and the third refresh rate are set by the electronic device in response to a setting operation of the user.

Optionally, the third refresh rate is greater than the second refresh rate.

An embodiment of this application further provides a computer-readable storage medium. The computer-readable storage medium includes computer instructions. When the computer instructions are run on an electronic device, the electronic device is enabled to perform the refresh rate adjustment method according to the foregoing embodiments, or the electronic device is enabled to perform the functions or the steps performed by the mobile phone in the foregoing embodiments.

An embodiment of this application further provides a computer program product. When the computer program product runs on a computer, the computer is enabled to perform the refresh rate adjustment method according to the foregoing embodiments, or the electronic device is enabled to perform the functions or the steps performed by the mobile phone in the foregoing embodiments. The computer may be the foregoing electronic device Based on the descriptions of the foregoing implementations, a person skilled in the art may clearly understand that, for the purpose of convenient and brief description, only division into the foregoing functional modules is used as an example for description. In actual application, the foregoing functions can be allocated to different functional modules based on a requirement, that is, an internal structure of the apparatus is divided into different functional modules to complete all or some of the functions described above.

In the several embodiments provided in this application, it should be understood that the disclosed apparatus and method may be implemented in another manner. For example, the foregoing apparatus embodiments are merely examples. For example, division into the modules or the units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, and may be located in one position, or may be distributed in a plurality of different positions. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware or a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium, and includes several instructions for instructing a device (which may be a microcontroller, a chip, or the like) or a processor (processor) to perform all or some of the steps of the methods described in embodiments of this application. The storage medium includes any medium that can store program code such as a USB flash drive, a removable hard disk, a read-only memory (read-only memory, ROM), a random access memory (random access memory, RAM), a magnetic disk, or an optical disc.

The foregoing content is merely a specific implementation of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, applied to an electronic device having a display, wherein the method comprises:
   start playing, by the electronic device, a first video file at a first refresh rate in response to a first operation;
   after starting to play the first video file at the first refresh rate, when the electronic device receives an interaction operation, adjusting, by the electronic device, a refresh rate of the display to a second refresh rate based on the interaction operation, wherein the second refresh rate is equal to a maximum refresh rate of the display;
   after receiving the interaction operation, when the electronic device does not receive any further interaction operation within a preset duration from a time point of receiving the interaction operation, the first video file is being played, and a first frame rate of the first video file is greater than a second frame rate corresponding to a third refresh rate, adjusting, by the electronic device, the refresh rate of the display to the third refresh rate, wherein the third refresh rate is less than the second refresh rate; and after receiving the interaction operation, when the electronic device does not receive any further interaction operation within the preset duration, the first video file is being played, and the first frame rate of the first video file is less than or equal to the second frame rate corresponding to the third refresh rate, adjusting, by the electronic device, the refresh rate of the display of the electronic device to a fourth refresh rate, wherein the third refresh rate is used to display the first video file in the case of not receiving the interaction operation within the preset duration, and the second refresh rate is used to support an animation effect while playing the first video file.

2. The method according to claim 1, further comprising:
obtaining, by the electronic device, a frame rate of each video source file of at least one video source file;
using, by the electronic device, a maximum frame rate in frame rates of all of the at least one video source file as a third frame rate, or using, by the electronic device, an average value of frame rates of all of the at least one video source file as a third frame rate, or when receiving a selection operation performed by a user on frame rates of all of the at least one video source file, using, by the electronic device, a frame rate selected by the user as a third frame rate; and
determining the first frame rate based on the third frame rate.

3. The method according to claim 2, wherein determining the first frame rate based on the third frame rate comprises:
when the third frame rate is within a preset frame rate range, using the third frame rate as the first frame rate.

4. The method according to claim 3, further comprising:
when the third frame rate is not within the preset frame rate range, using the second frame rate corresponding to the third refresh rate as the first frame rate.

5. The method according to claim 2, wherein obtaining, by the electronic device, the frame rate of each video source file of the at least one video source file comprises:
performing, by the electronic device, the following operations on each video source file of the at least one video source file, to obtain the frame rate of each of the at least one video source file:
obtaining, by the electronic device, a frame rate in attribute information of the respective video source file; or
searching, by the electronic device, a search platform for the respective video source file, to obtain a frame rate of the respective video source file from the search platform; or
calculating, by the electronic device, the frame rate of the respective video source file based on a characteristic parameter of the respective video source file, wherein the characteristic parameter comprises a size, duration, and resolution.

6. The method according to claim 1, wherein:
the second refresh rate and the third refresh rate are pre-configured; or
the second refresh rate and the third refresh rate are set by the electronic device in response to a setting operation of a user.

7. An electronic device, comprising:
a display, a memory, and one or more processors, wherein the display and the memory are coupled to the one or more processors;
wherein the memory stores computer program code, the computer program code comprises computer instructions, and when the computer instructions are executed by the one or more processors, the electronic device is enabled to perform the following:
start playing a first video file at a first refresh rate in response to a first operation;
after starting to play the first video file at the first refresh rate, when the electronic device receives an interaction operation, adjusting, by the electronic device, a refresh rate of the display to a second refresh rate based on the interaction operation, wherein the second refresh rate is equal to a maximum refresh rate of the display; and
after receiving the interaction operation, when the electronic device does not receive any further interaction operation within a preset duration from a time point of receiving the interaction operation, the first video file is being played, and a first frame rate of the first video file is greater than a second frame rate corresponding to a third refresh rate, adjusting the refresh rate of the display to the third refresh rate, wherein the third refresh rate is less than the second refresh rate; and
after receiving the interaction operation, when the electronic device does not receive any further interaction operation within the preset duration, the first video file is being played, and the first frame rate of the first video file is less than or equal to the second frame rate corresponding to the third refresh rate, adjusting the refresh rate of the display to a fourth refresh rate, wherein the third refresh rate is used to display the first video file in the case of not receiving the interaction operation within the preset duration, and the second refresh rate is used to support an animation effect while playing the first video file.

8. The electronic device according to claim 7, wherein when the computer instructions are executed by the one or more processors, the electronic device is further enabled to perform the following:
obtaining a frame rate of each of at least one video source file;
using a maximum frame rate in frame rates of all of the at least one video source file as a third frame rate, or using an average value of frame rates of all of the at least one video source file as a third frame rate, or when receiving a selection operation performed by a user on frame rates of all of the at least one video source file, using a frame rate selected by the user as a third frame rate; and
determining the first frame rate based on the third frame rate.

9. The electronic device according to claim 8, wherein determining the first frame rate based on the third frame rate comprises:
when the third frame rate is within a preset frame rate range, using the third frame rate as the first frame rate.

10. A non-transitory computer-readable storage medium, comprising computer instructions, wherein when the computer instructions are run on an electronic device, the electronic device is enabled to perform the following:

start playing a first video file at a first refresh rate of a display of the electronic device in response to a first operation;

after starting to play the first video file at the first refresh rate, when the electronic device receives an interaction operation, adjusting, by the electronic device, a refresh rate of the display to a second refresh rate based on the interaction operation, wherein the second refresh rate is equal to a maximum refresh rate of the display;

after receiving the interaction operation, when the electronic device does not receive any further interaction operation within a preset duration from a time point of receiving the interaction operation, the first video file is being played, and a first frame rate of the first video file is greater than a second frame rate corresponding to a third refresh rate, adjusting the refresh rate of the display to the third refresh rate, wherein the third refresh rate is less than the second refresh rate; and after receiving the interaction operation, when the electronic device does not receive any further interaction operation within the preset duration, the first video file is being played, and the first frame rate of the first video file is less than or equal to the second frame rate corresponding to the third refresh rate, adjusting the refresh rate of the display to a fourth refresh rate, wherein the third refresh rate is used to display the first video file in the case of not receiving the interaction operation within the preset duration, and the second refresh rate is used to support an animation effect while playing the first video file.

11. The non-transitory computer-readable storage medium according to claim 10, wherein when the computer instructions are run on the electronic device, the electronic device is enabled to further perform the following:

obtaining a frame rate of each of at least one video source file;

using a maximum frame rate in frame rates of all of the at least one video source file as a third frame rate, or using an average value of frame rates of all of the at least one video source file as a third frame rate, or when receiving a selection operation performed by a user on frame rates of all of the at least one video source file, using a frame rate selected by the user as a third frame rate; and determining the first frame rate based on the third frame rate.

12. The non-transitory computer-readable storage medium according to claim 11, wherein determining the first frame rate based on the third frame rate comprises:

when the third frame rate is within a preset frame rate range, using the third frame rate as the first frame rate.

13. The non-transitory computer-readable storage medium according to claim 11, wherein when the computer instructions are run on the electronic device, the electronic device is further enabled to perform the following:

when the second frame rate is not within a preset frame rate range, using the second frame rate corresponding to the third frame rate as the first frame rate.

14. The method according to claim 1, further comprising:

after adjusting the refresh rate of the display to the second refresh rate, playing, by the electronic device, the animation effect and the first video file at the second refresh rate.

15. The electronic device according to claim 7, wherein when the computer instructions are executed by the one or more processors, the electronic device is enabled to perform the following:

after adjusting the refresh rate of the display to the second refresh rate, playing, by the electronic device, the animation effect and the first video file at the second value of the refresh rate.

16. The non-transitory computer-readable storage medium according to claim 10, wherein when the computer instructions are run on an electronic device, the electronic device is enabled to perform the following:

after adjusting the refresh rate of the display to the second refresh rate, playing, by the electronic device, the animation effect and the first video file at the second refresh rate.

* * * * *

UNITED STATES PATENT AND TRADEMARK OFFICE
CERTIFICATE OF CORRECTION

| | |
|---|---|
| PATENT NO. | : 12,394,392 B2 |
| APPLICATION NO. | : 17/998910 |
| DATED | : August 19, 2025 |
| INVENTOR(S) | : Heping Zhao |

Page 1 of 1

It is certified that error appears in the above-identified patent and that said Letters Patent is hereby corrected as shown below:

In the Claims

In Column 30, in Claim 15, Line 31, before "refresh" delete "value of the".

Signed and Sealed this
Fourteenth Day of October, 2025

John A. Squires
*Director of the United States Patent and Trademark Office*